United States Patent
Nagasaka et al.

(10) Patent No.: US 10,531,374 B2
(45) Date of Patent: Jan. 7, 2020

(54) BASE STATION, PROCESSOR, RADIO TERMINAL, AND NETWORK APPARATUS

(71) Applicant: KYOCERA CORPORATION, Kyoto (JP)

(72) Inventors: Yushi Nagasaka, Ritto (JP); Kugo Morita, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/970,003

(22) Filed: May 3, 2018

(65) Prior Publication Data
US 2018/0255507 A1    Sep. 6, 2018

Related U.S. Application Data

(63) Continuation of application No. PCT/JP2016/082579, filed on Nov. 2, 2016.

(60) Provisional application No. 62/251,458, filed on Nov. 5, 2015.

(51) Int. Cl.
| | | |
|---|---|---|
| *H04W 48/16* | (2009.01) |
| *H04W 76/15* | (2018.01) |
| *H04W 4/00* | (2018.01) |
| *H04W 8/08* | (2009.01) |
| *H04W 36/00* | (2009.01) |
| *H04W 40/24* | (2009.01) |
| *H04W 84/12* | (2009.01) |
| *H04W 88/06* | (2009.01) |
| *H04W 92/02* | (2009.01) |

(52) U.S. Cl.
CPC ............. *H04W 48/16* (2013.01); *H04W 8/08* (2013.01); *H04W 40/248* (2013.01); *H04W 76/15* (2018.02); *H04W 88/06* (2013.01)

(58) Field of Classification Search
CPC ....... H04W 48/16; H04W 76/15; H04W 4/00; H04W 8/08; H04W 36/0061; H04W 40/248; H04W 84/12; H04W 88/06; H04W 92/02
See application file for complete search history.

(56) References Cited

U.S. PATENT DOCUMENTS

2017/0188253 A1 * 6/2017 Bergstrom ............ H04W 24/10

FOREIGN PATENT DOCUMENTS

WO    2015/069173 A1    5/2015

OTHER PUBLICATIONS

Nokia Networks; "Baseline CR for parameter exchange for LTE-WLAN interworking"; 3GPP TSG-RAN WG3 Meeting #89bis; R3-151828; Oct. 5-9, 2015; 37 pages; Sophia Antipolis, France.

(Continued)

*Primary Examiner* — Ronald B Abelson
(74) *Attorney, Agent, or Firm* — Studebaker & Brackett PC

(57) ABSTRACT

A base station according to an embodiment is a base station in Evolved-Universal Terrestrial Radio Access Network (E-UTRAN). The base station includes a processor. The processor is configured to configure in a radio terminal a mobility set for LTE-WLAN aggregation (LWA), the mobility set configured of a set of access points in wireless local area network (WLAN), modify the mobility set, and transmit information indicating the modified mobility set to the radio terminal.

3 Claims, 17 Drawing Sheets

(56) References Cited

OTHER PUBLICATIONS

3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2; 3GPP TS 36.300 V12.6.0; Jun. 2015; pp. 1-254; Release 12; 3GPP Organizational Partners.
Ericsson; Selling Up the Xw; 3GPP TSG-RAN WG3 #87bis; R3-150740; Apr. 20-24, 2015; pp. 1-4; Tenerife—Santa Cruz, Spain.
Ericsson; Mobility procedures for LTE-WLAN aggregation; 3GPP TSG-RAN WG2 #91; Tdoc R2-153689; Aug. 24-28, 2015; pp. 1-7; Beijing, China.
Catt; Discussion on Architecture and Procedure of C-plane for LTE-WLAN Aggregation; 3GPP TSG RAN WG2 Meeting #91; R2-153109; Aug. 24-28, 2015; pp. 1-6; Beijing, China.
Ericsson; LTE-WLAN Aggregation Signal Flows; 3GPP TSG-RAN WG3 #89; R3-151639; Aug. 24-28, 2015; pp. 1-5; Beijing, China.

\* cited by examiner

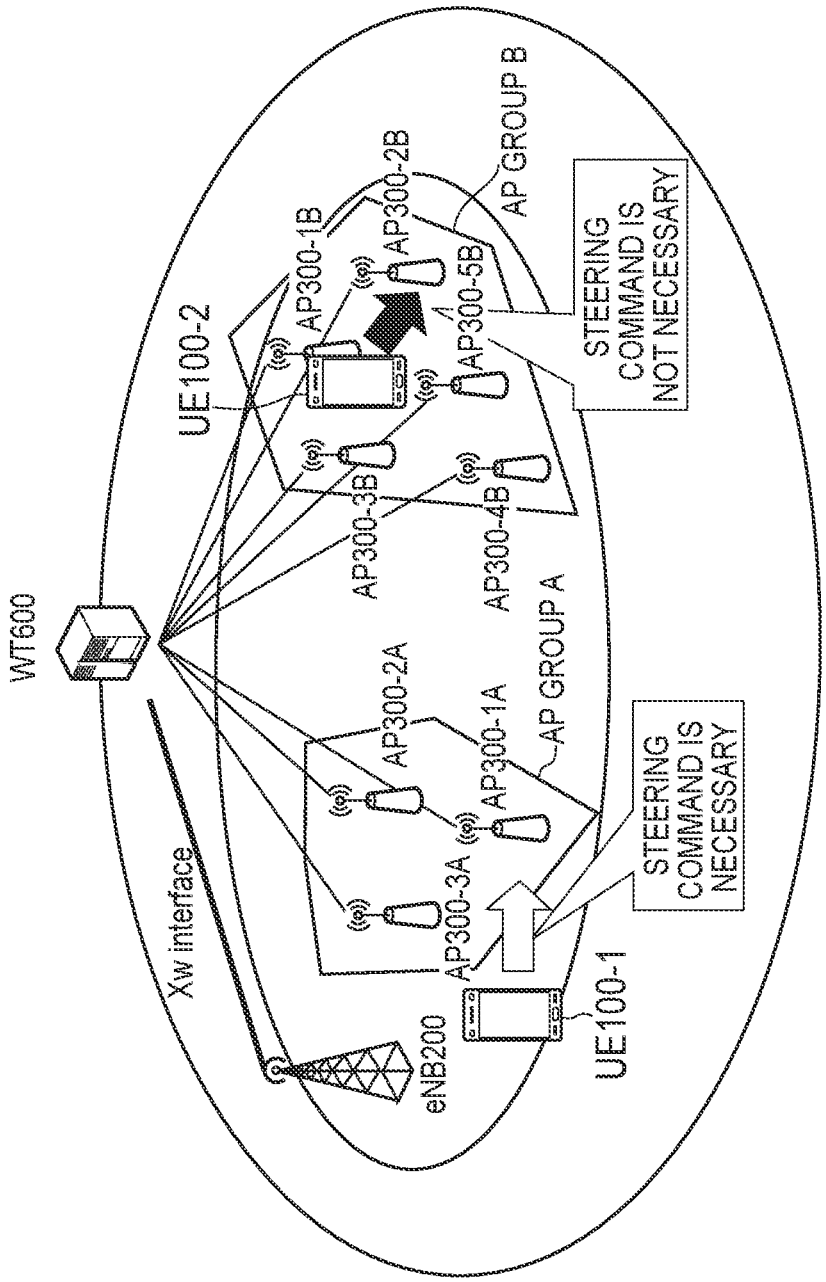

| IE/Group Name | Presence | Range | IE type and reference | Semantics description |
|---|---|---|---|---|
| Message Type | M | | 9.2.13 | |
| Global eNB ID | M | | 9.2.22 | |
| Served AP groups List | | | | Infomation of groups managed by eNB |
| >AP group information | | | | Each group infomation |
| >>Group ID | | | | Group ID |
| >>>Served APs List | | | | Infomation of APS included in group |
| >>>>AP ID | | | | AP ID |

| IE/Group Name | Presence | Range | IE type and reference | Semantics description |
|---|---|---|---|---|
| Message Type | M | | 9.2.13 | |
| Served AP groups To Add | | | | |
| >Served AP Groups List | | | | |
| >>AP group information | | | | |
| >>>Group ID | | | | |
| >>>>Served APs List | | | | |
| >>>>>AP ID | | | | |

FIG. 13

| IE/Group Name | Presence | Range | IE type and reference | Semantics description |
|---|---|---|---|---|
| Message Type | M | | 9.2.13 | |
| eNB Measurement ID | M | | INTEGER (1..4095,...) | Allocated by eNB |
| WT Measurement ID | C-ifRegistration RequestStop | | INTEGER (1..4095,...) | Allocated by WT |
| Registration Request | M | | ENUMERATED(start, stop, ...) | A value set to "stop", indicates a request to stop all cells measurements. |
| Report Characteristics | O | | BITSTRING (SIZE(32)) | |
| Group To Report | | | | |
| >Group To Report Item | | | | |
| >>Group ID | | | | |
| AP To Report | | | | AP ID list for which measurement is needed |
| >AP To Report Item | | 1 .. <maxCellineNB> | | |
| >>>AP ID | M | | ECGI 9.2.14 | |
| >>>BSS Load | | | | |
| >>>UE Average data rate | | | | |
| >>>BS Average Access Delay / BSS AC Average Delay | | | | |
| >>>WAN Metrics | | | | |

FIG. 14

| IE/Group Name | Presence | Range | IE type and reference | Semantics description |
|---|---|---|---|---|
| Message Type | M | | 9.2.13 | |
| eNB Measurement ID | M | | INTEGER (1..4095,...) | Allocated by eNB$_1$ |
| WT Measurement ID | M | | INTEGER (1..4095,...) | Allocated by WT |
| Group Measurement Result | | | | |
| AP Measurement Result | | | | |
| >AP Measurement Result Item | | 1 .. <maxCellineNB> | | |
| >>AP ID | M | | ECGI 9.2.14 | |
| >>>BSS Load | | | | |
| >>>UE Average data rate | | | | |
| >>>BS Average Access Delay / BSS AC Average Delay | | | | |
| >>>WAN Metrics | | | | |

FIG. 16A

| IE/Group Name | Presence | Range | IE type and reference | Semantics description |
|---|---|---|---|---|
| Message Type | M | | 9.2.13 | |
| Global eNB ID | M | | 9.2.22 | |
| Reported AP list | | | | AP reported from UE |
| >AP ID | | | | AP ID |
| Served Cells | | 1 .. <maxCellineNB> | | Complete list of cells served by the eNB |
| >Served Cell Information | M | | 9.2.8 | |
| >Neighbour Information | | 0 .. <maxnoofNeighbours> | | |
| GU Group Id List | | 0 .. <maxfPools> | | List of all the pools to which the eNB belongs |
| >GU Group Id | M | | 9.2.20 | |

FIG. 16B

| IE/Group Name | Presence | Range | IE type and reference | Semantics description |
|---|---|---|---|---|
| Message Type | M | | 9.2.13 | |
| Global WT ID | M | | | |
| Reported AP Info list | | | | AP infomation reported from UE |
| >AP group ID List | | | | Each group information |
| >>Group ID | | | | Group ID |
| >>>AP ID List | | | | Information of all APS Belonging to group |
| >>>>AP ID | | | | AP ID (BSSID) |
| Criticality Diagnostics | O | | 9.2.7 | |

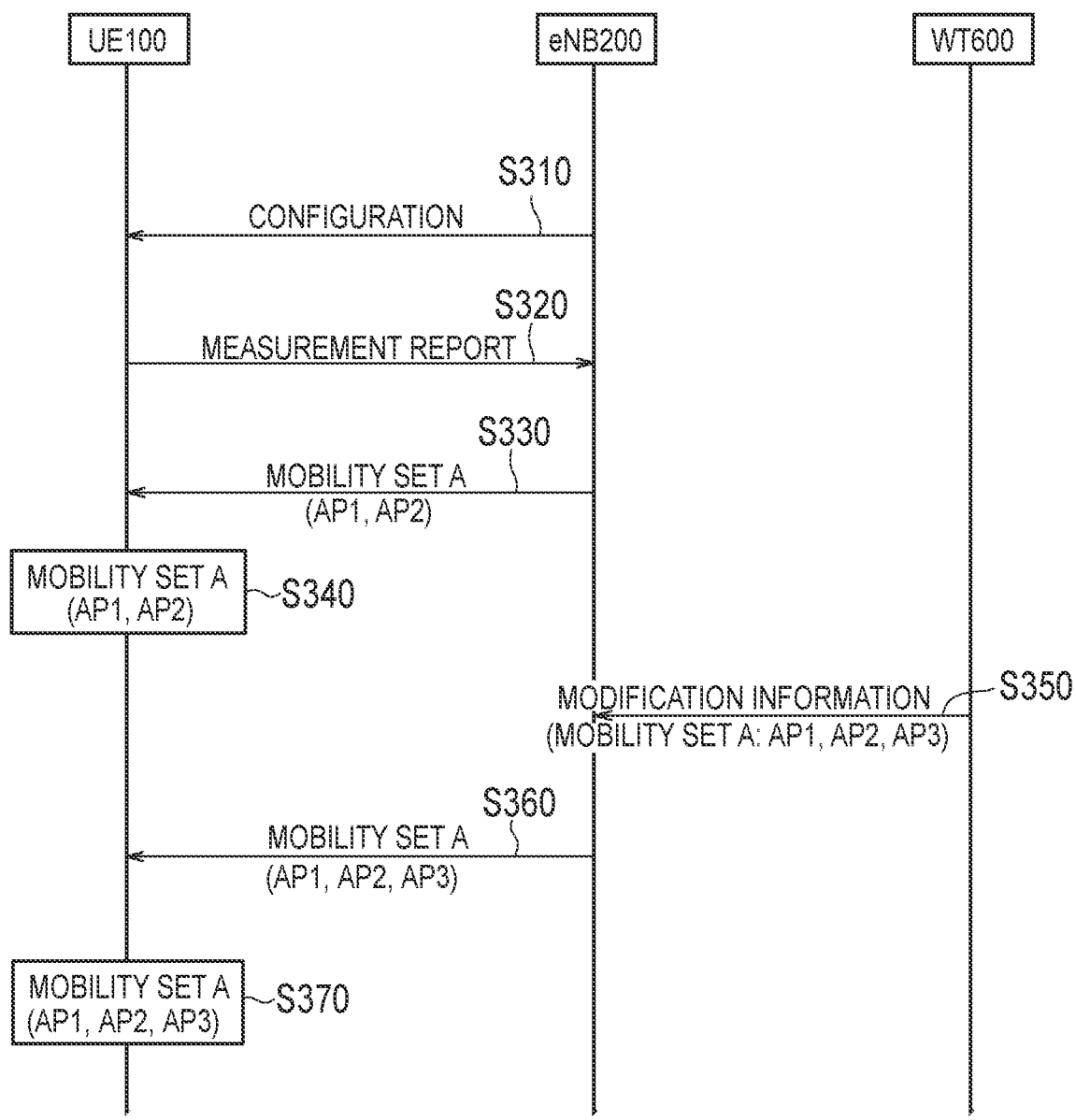

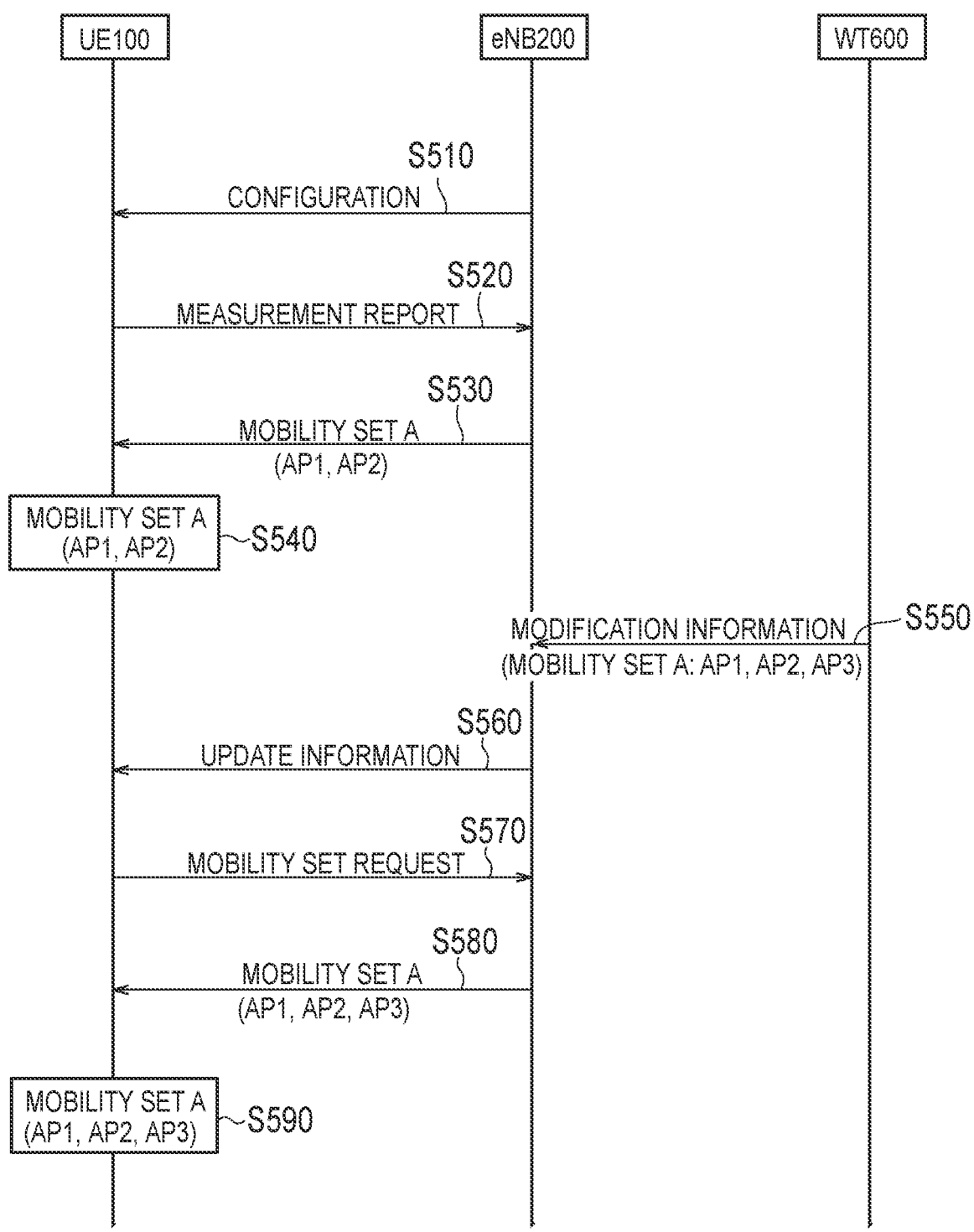

US 10,531,374 B2

BASE STATION, PROCESSOR, RADIO TERMINAL, AND NETWORK APPARATUS

RELATED APPLICATION

This application is a continuation application of international application PCT/JP2016/082579, filed Nov. 2, 2016, which claims the benefit of U.S. Provisional Patent Application No. 62/251,458, filed on Nov. 5, 2015, the entire contents of which are incorporated herein by reference.

TECHNICAL FIELD

The present application relates to a base station, a processor, a radio terminal, and a network apparatus used in a communication system.

BACKGROUND ART

Long term evolution (LTE) defined in 3rd generation partnership project (3GPP) as a standardization project of the cellular communication techniques support a cellular/WLAN interworking technique after a release 12. With the technique, a radio terminal in the RRC connected state or RRC idle state switches bidirectional traffics (network selection and traffic steering) between E-UTRAN and WLAN.

In order to effectively use the cellular/WLAN interworking technique, an introduction of an Xw interface is being discussed. An Xw interface is set between a base station and a wireless LAN termination (WT) for managing a wireless LAN access point. The base station can acquire information related to WLAN (such as information related to AP in the cell of the base station) from the wireless LAN termination (wireless LAN termination node) via the Xw interface.

SUMMARY

A base station according to an embodiment is a base station in Evolved-Universal Terrestrial Radio Access Network (E-UTRAN). The base station includes a processor, wherein the processor is configured to configure in a radio terminal a mobility set for LTE-WLAN aggregation (LWA), the mobility set configured of a set of access points in wireless local area network (WLAN), modify the mobility set, and transmit information indicating the modified mobility set to the radio terminal.

A processor according to an embodiment is a processor for controlling a base station in evolved-universal terrestrial radio access network (E-UTRAN). The processor is configured to configure in a radio terminal a mobility set for LTE-WLAN aggregation (LWA), the mobility set configured of a set of access points in wireless local area network (WLAN), modify the mobility set, and transmit information indicating the modified mobility set to the radio terminal, and the information indicating the modified mobility set includes information indicating an access point added to the mobility set configured in the radio terminal.

A radio terminal according to an embodiment includes a processor. The processor is configured with a mobility set configured of a set of access points in wireless local area network (WLAN) for LTE-WLAN aggregation (LWA) by a base station in evolved-universal terrestrial radio access network (E-UTRAN), configured to receive information indicating a modified mobility set from the base station, and configured to modify the configured mobility set on the basis of the information.

A processor according to an embodiment is a processor for controlling a radio terminal. The processor is configured with a mobility set configured of a set of access points in wireless local area network (WLAN) for LTE-WLAN aggregation (LWA) by a base station in evolved-universal terrestrial radio access network (E-UTRAN), configured to receive information indicating a modified mobility set from the base station, and configured to modify the configured mobility set on the basis of the information.

A network apparatus according to an embodiment is a network apparatus as a termination in wireless local area network (WLAN). The network apparatus includes a processor. The processor is configured to receive a mobility set configured of a set of access points in the WLAN from a base station in evolved-universal terrestrial radio access network (E-UTRAN), and the mobility set is configured in a radio terminal for LTE-WLAN aggregation (LWA).

A processor according to an embodiment is a processor for controlling a network apparatus as a termination in wireless local area network (WLAN). The processor is configured to receive a mobility set configured of a set of access points in the WLAN from a base station in evolved-universal terrestrial radio access network (E-UTRAN), and the mobility set is configured in a radio terminal for LTE-WLAN aggregation (LWA).

BRIEF DESCRIPTION OF DRAWINGS

FIG. 7 is a diagram for explaining an operation environment according to a first embodiment.

FIG. 13 is a diagram for explaining operations according to the second embodiment.

FIG. 14 is a diagram for explaining operations according to the second embodiment.

FIGS. 16A and 16B are diagrams for explaining operations according to the third embodiment.

FIG. 18 is a sequence diagram for explaining an operation pattern 1 according to a fourth embodiment.

FIG. 20 is a sequence diagram for explaining an operation pattern 3 according to the fourth embodiment.

DESCRIPTION OF EMBODIMENTS

Overview of Embodiments

Figure 1:
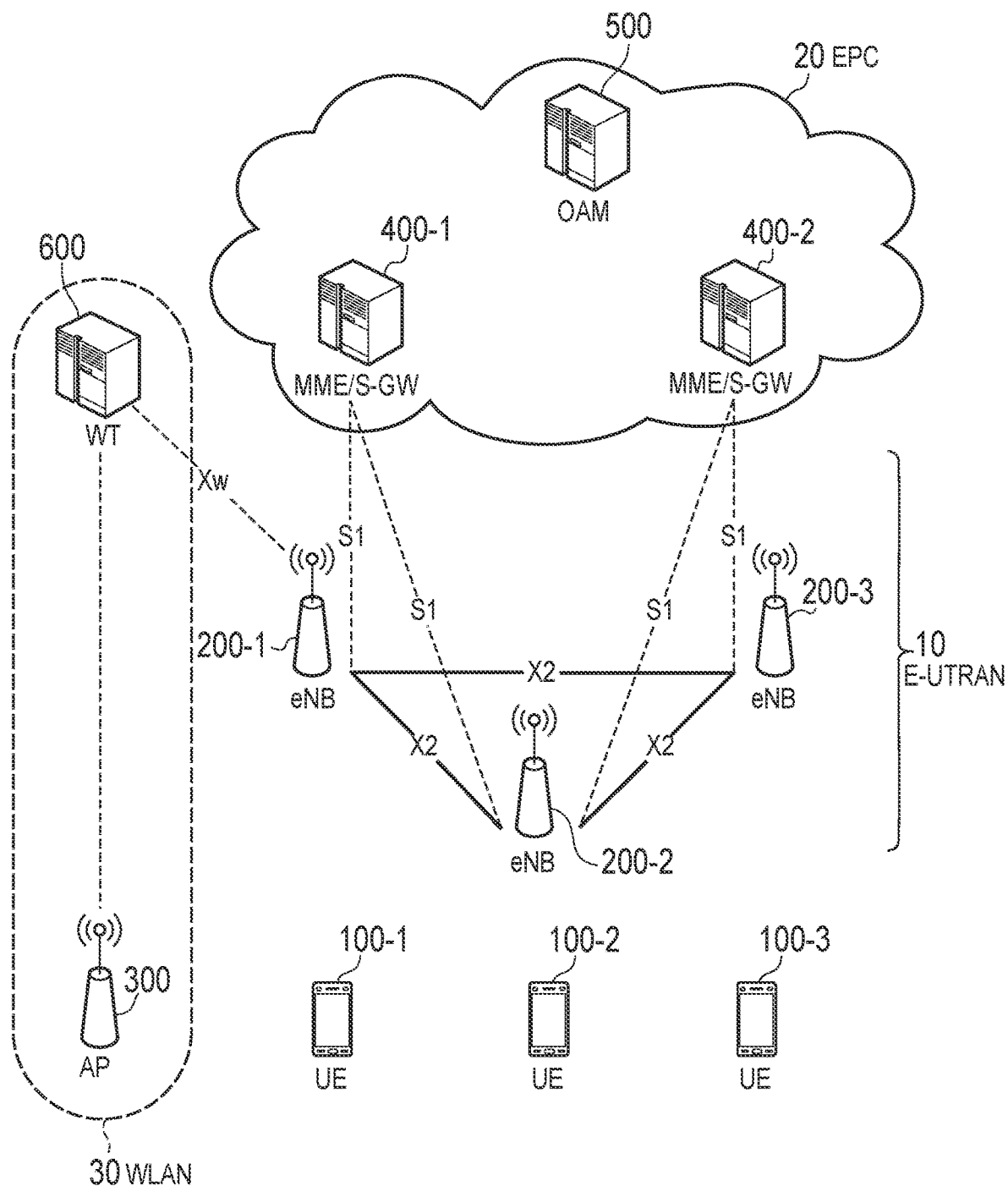
FIG. 1 is a diagram illustrating a system configuration.

A base station according to an embodiment is a base station in Evolved-Universal Terrestrial Radio Access Network (E-UTRAN). The base station includes a processor, wherein the processor is configured to configure in a radio terminal a mobility set for LTE-WLAN aggregation (LWA), the mobility set configured of a set of access points in wireless local area network (WLAN), modify the mobility set, and transmit information indicating the modified mobility set to the radio terminal.

The information indicating the modified mobility set may include information indicating an access point added to the mobility set configured in the radio terminal.

The information indicating the modified mobility set may include information indicating an access point deleted from the mobility set configured in the radio terminal.

The processor may be configured to notify the modified mobility set to a network apparatus as a termination in the WLAN.

A processor according to an embodiment is a processor for controlling a base station in evolved-universal terrestrial radio access network (E-UTRAN). The processor is configured to configure in a radio terminal a mobility set for LTE-WLAN aggregation (LWA), the mobility set configured of a set of access points in wireless local area network (WLAN), modify the mobility set, and transmit information indicating the modified mobility set to the radio terminal, and the information indicating the modified mobility set includes information indicating an access point added to the mobility set configured in the radio terminal.

A radio terminal according to an embodiment includes a processor. The processor is configured with a mobility set configured of a set of access points in wireless local area network (WLAN) for LTE-WLAN aggregation (LWA) by a base station in evolved-universal terrestrial radio access network (E-UTRAN), configured to receive information indicating a modified mobility set from the base station, and configured to modify the configured mobility set on the basis of the information.

A processor according to an embodiment is a processor for controlling a radio terminal. The processor is configured with a mobility set configured of a set of access points in wireless local area network (WLAN) for LTE-WLAN aggregation (LWA) by a base station in evolved-universal terrestrial radio access network (E-UTRAN), configured to receive information indicating a modified mobility set from the base station, and configured to modify the configured mobility set on the basis of the information.

A network apparatus according to an embodiment is a network apparatus as a termination in wireless local area network (WLAN). The network apparatus includes a processor. The processor is configured to receive a mobility set configured of a set of access points in the WLAN from a base station in evolved-universal terrestrial radio access network (E-UTRAN), and the mobility set is configured in a radio terminal for LTE-WLAN aggregation (LWA).

A processor according to an embodiment is a processor for controlling a network apparatus as a termination in wireless local area network (WLAN). The processor is configured to receive a mobility set configured of a set of access points in the WLAN from a base station in evolved-universal terrestrial radio access network (E-UTRAN), and the mobility set is configured in a radio terminal for LTE-WLAN aggregation (LWA).

A radio terminal according to an embodiment is capable of performing a mobility between wireless LAN access points without notifying a base station on the basis of a mobility set related to a group of wireless LAN access points. The radio terminal includes a transmitter configured to a report related to a detected wireless LAN access point, and a controller configured to configure a mobility set based on the information of the mobility set when receiving the information of the mobility set due to the report. The controller is configured to modify the configured mobility set based on the information related to modification of the mobility set when receiving the information related to modification of the mobility set after configuring the mobility set.

The information related to modification of the mobility set may be information related to modification of wireless LAN access points configuring the configured mobility set. The controller may modify the configured mobility set by updating the configured mobility set.

The information related to modification of the mobility set may be information related to difference with wireless LAN access points configuring the configured mobility set.

The information related to modification of the mobility set may be information of a new mobility set different from the configured mobility set. The controller may modify the configured mobility set by configuring a new mobility set based on the information of the new mobility set.

The transmitter may transmit to a base station a message for requesting information of a modified mobility set based on the information related to modification of the mobility set. The controller may modify the configured mobility set based on the information of modified mobility set when receiving the information of modified mobility set.

The information related to modification of the mobility set may be information caused by a different condition from the report.

A base station according to an embodiment includes a receiver configured to receive a report related to a detected wireless LAN access point from a radio terminal capable of performing a mobility between wireless LAN access points without notifying the base station on the basis of a mobility set related to a group of wireless LAN access points, a transmitter configured to transmit, to the radio terminal, information of a mobility set due to the report, and a controller configured to modify the mobility set. The transmitter transmits information related to modification of the mobility set when the mobility set is modified.

The transmitter may transmit information related to modification of wireless LAN access points configuring the mobility set transmitted to the radio terminal, as the information related to modification of the mobility set.

The transmitter may transmit information related to difference with wireless LAN access points configuring the mobility set transmitted to the radio terminal, as the information related to modification of the mobility set.

The transmitter may transmit information of a new mobility set different from the mobility set transmitted to the radio terminal, as the information related to modification of the mobility set.

The transmitter may transmit, to the radio terminal, the information related to modification of the mobility set when receiving a message for requesting information related to the information related to modification of the mobility set.

The controller may modify the mobility set based on a different condition from the report.

The description will be made below with reference to the drawings assuming that an LTE system as a cellular communication system configured in conformity to the 3GPP standard and a wireless LAN (WLAN) system can be associated with each other.

(System Configuration)

FIG. 1 is a diagram illustrating a system configuration according to the embodiments. As illustrated in FIG. 1, a LTE system includes a plurality of UEs (User Equipment) 100, an evolved universal terrestrial radio access network (E-UTRAN) 10, and an evolved packet core (EPC) 20.

The E-UTRAN 10 corresponds to a cellular RAN. The EPC 20 corresponds to a core network. The E-UTRAN 10 and the EPC 20 configure an LTE system network.

The UE 100 is a mobile radio communication apparatus. The UE 100 corresponds to a radio terminal (user equipment). The UE 100 is a terminal (dual terminal) for supporting communication systems for both cellular communication and WLAN communication.

The E-UTRAN 10 includes a plurality of eNBs 200 (evolved Node-B). The eNB 200 corresponds to a base station. The eNB 200 manages one or more cells. The eNB 200 makes radio communication with the UEs 100 existing in its cells. "Cell" is used as a term indicating the minimum unit of a radio communication area. "Cell" is used also as a term indicating a function (resource) for making radio communication with the UEs 100. The eNB 200 has a radio resource management (RRM) function, a user data routing function, a measurement control function for mobility control and scheduling, and the like.

The eNBs 200 are mutually connected via X2 interfaces. The eNBs 200 are connected via S1 interfaces to mobility management entity (MME)/serving-gateway (S-GW) 400 included in the EPC 20. The eNBs 200 are connected to a WT 600 described below via Xw interfaces.

The EPC 20 includes a plurality of MME/S-GW 400 and an OAM 500. MME is a network node for conducting various mobility controls on the UEs 100. MME corresponds to a control station. S-GW is a network node for conducting user data transfer control. S-GW corresponds to a switching station. OAM is a server apparatus managed by an operator. OAM maintains and monitors the E-UTRAN 10.

The WLAN 30 includes WLAN access points (which will be denoted as "AP" below) 300 and the WLAN termination (which will be denoted as "WT" below) 600. The AP 300 is an AP (Operator controlled AP) managed by an NW operator of the LTE system, for example. The WT 600 is a node in WLAN. The WT 600 is connected to the eNB 200 via the Xw interface. The WT 600 manages one or more APs 300. The WT 600 can send the information on its managing APs 300 to the eNB 200. The WT 600 can send the information received from the eNB 200 to the APs 300 managed by the WT 600.

The Xw interface is a logical interface between 3GPP RAN and WLAN. The Xw interface terminates at the eNB 200 on the LTE (3GPP RAN) side. The Xw interface terminates at the WT 600 on the WLAN side. In FIG. 1, the Xw interface directly connects the eNB 200 and the WT 600. The Xw interface may route via the MME/S-GW 400 and the P-GW 500.

The WLAN 30 is configured in conformity to the IEEE 802.11 standards, for example. The APs 300 make WLAN communication with the UE 100 at a different frequency band from the cellular frequency band. Generally, WLAN communication is made at an unlicensed band. Cellular communication is made at a licensed band. The APs 300 are connected to the EPC 20 via a router or the like.

The EPC 20 may further include access network discovery and selection function (ANDSF) server. The ANDSF sever manages ANDSF information on the WLAN 30. The ANDSF server provides the UEs 100 with the ANDSF information on the WLAN 30.

Figure 2:
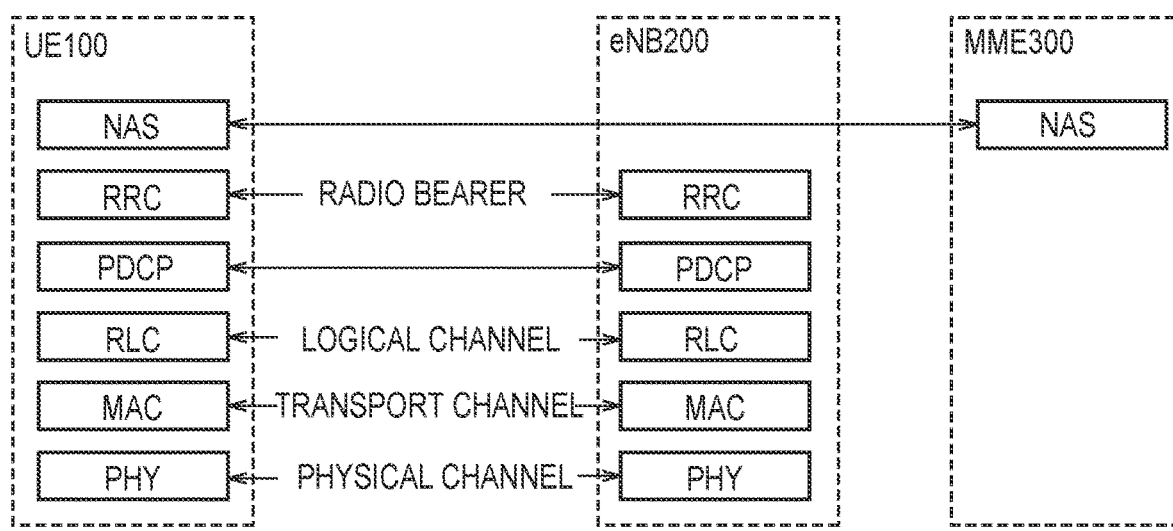
FIG. 2 is a protocol stack diagram of a radio interface in an LTE system.

FIG. 2 is a protocol stack diagram of a radio interface in the LTE system. As illustrated in FIG. 2, the radio interface protocol is divided into the first layer to the third layer in the OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulating/demodulating, antenna mapping/demapping, and resource mapping/demapping. Data and control signals are sent via a physical channel between the physical layer of the UE 100 and the physical layer of the eNB 200.

The MAC layer performs data priority control, retransmission processing by hybrid ARQ (HARQ), random access procedure, and the like. Data and control signals are sent via a transport channel between the MAC layer of the UE 100 and the MAC layer of the eNB 200. The MAC layer of the eNB 200 includes a scheduler. The scheduler determines transport formats of the up/down links (transport block size, modulating/encoding system (MCS)), and assignment resource blocks to the UEs 100.

The RLC layer sends data to the RLC layer on the reception side by use of the functions of the MAC layer and the physical layer. Data and control signals are sent via a logical channel between the RLC layer of the UE 100 and the RLC layer of the eNB 200.

The PDCP layer performs header compressing/decompressing and encrypting/decrypting.

The RRC layer is defined by only a control plane handling the control signals. Messages (RRC messages) for various configurations are sent between the RRC layer of the UE 100 and the RRC layer of the eNB 200. The RRC layer controls the logical channel, the transport channel, and the physical channel depending on establishment, reestablishment or release of a radio bearer. When RRC of the UE 100 and RRC of the eNB 200 are connected (RRC connection), the UE 100 is in the RRC connected state (connected state). When RRCs are not connected (not RRC connected), the UE 100 is in the RRC idle state (idle state).

A non-access stratum (NAS) layer higher than the RRC layer performs session management, mobility management, and the like.

(Basic Operations of Terminal Based Switching Control)

The cellular/WLAN radio interworking technique has been supported after the 3GPP release 12. With the cellular/WLAN radio interworking technique, the UE 100 in the RRC connected state or in the RRC idle state performs bidirectional traffic steering (network selection and traffic steering) between the E-UTRAN 10 and the WLAN 30.

The traffic steering is performed in the UE 100 based manner with the help of the E-UTRAN 10. The traffic steering is performed in units of access point name (APN). The switching control will be denoted as "UE based switching control" below.

The E-UTRAN 10 transmits auxiliary information (RAN assistance parameters) to the UEs 100 by broadcast RRC signaling or dedicated RRC signaling. Broadcast RRC signaling is system information block (SIB), for example. Dedicated RRC signaling is an RRC Connection Reconfiguration message, for example.

Auxiliary information includes E-UTRAN signal intensity (reception power) threshold and quality threshold, WLAN channel use rate threshold, WLAN backhaul data rate threshold, WLAN signal intensity (reception power) threshold and quality threshold, and the like. The auxiliary information may include a WLAN identifier as a target of UE based switching control. The WLAN identifier is service set identifier (SSID), basic service set identifier (BSSID), homogenous extended service set identifier (HESSID), or the like. The auxiliary information may include parameters designating a period in which the thresholds (determination conditions) are to be met.

The UE 100 for supporting UE based switching control receives the auxiliary information and stores the received auxiliary information. The UE 100 may discard the stored auxiliary information when performing cell reselection or handover.

The UE 100 then performs UE based switching control.

Switching from cellular communication to WLAN communication or switching from the E-UTRAN 10 to the WLAN 30 will be first described by way of example. The UE 100 makes a switching determination as to whether to switch from cellular communication to WLAN communication under a first determination condition for cellular and a second determination condition for WLAN. Specifically, when both the first determination condition and the second determination condition are met, the UE 100 switches from cellular communication to WLAN communication.

---

RSRPmeas < ThreshServingOffloadWLAN, LowP; or
RSRQmeas < TresshServingOffloadWLAN, LowQ;

---

Here, "RSRPmeas" is reception power of a cellular reception signal, or reference signal reception power (RSRP) measured at the UE 100. "RSRQmeas" is reception quality of a cellular reception signal, or reference signal reception quality (RSRQ) measured at the UE 100. "ThreshServingOffloadWLAN, LowP" and "ThreshServingOffloadWLAN, LowQ" are included in the auxiliary information and are the thresholds for switching to the WLAN 30.

The second determination condition for target WLAN is as follows.

---

ChannelUtilizationWLAN < ThreshChUtilWAN, Low; and
BackhaulRateDlWLAN > ThreshBackhRateDLWLAN, High; and
BackhaulRateUlWLAN > ThreshBackhRateULWLAN, High; and
BeaconRSSI > ThreshBeaconRSSIWLAN, High;

---

Here, "ChannelUtilizationWLAN" is included in a WLAN beacon or probe response. "ChannelUtilizationWLAN" indicates a WLAN channel use rate or WLAN radio load level. "BackhaulRateDlWLAN" and "BackhaulRateUlWLAN" are provided by access network query protocol (ANQP). "BackhaulRateDlWLAN" and "BackhaulRateUlWLAN" indicate an available transmission rate of WLAN backhaul, or WLAN backhaul load level. "BeaconRSSI indicates a reception signal intensity of a beacon signal measured at the UE 100. "ThreshChUtilWLAN, Low," "ThreshBackhRateDLWLAN, High," "ThreshBackhRateULWLAN, High," and "ThreshBeaconRSSIWLAN, High" are included in the auxiliary information, and are the thresholds for switching to the WLAN 30.

When switching from cellular communication to WLAN communication, the UE 100 notifies information (move-traffic-to-WLAN indication) on traffic steering to WLAN communication together with (a list of (list of WLAN identifiers)) the identifiers (WLAN identifiers) of the APs 300 meeting the second determination condition to a higher/upper layer controlling bidirectional traffic steering between the E-UTRAN 10 and the WLAN 30. Specifically, the AS layer in the UE 100 notifies the WLAN identifiers (and their information) to the NAS layer in the UE 100. The NAS layer in the UE 100 then makes a notification to the higher station (MME) by use of the NAS procedure. The UE 100 switches from cellular communication to WLAN communication (switches from a communication path via the eNB 200 to a communication path via the APs 300) in response to a command from the higher station notified of the WLAN identifiers.

Switching from WLAN communication to cellular communication or switching from the WLAN 30 to the E-UTRAN 10 will be described by way of example. The UE 100 makes a switching determination as to whether to switch from WLAN communication to cellular communication under a third determination condition for cellular and a fourth determination condition for WLAN. Specifically, when either the third determination condition or the fourth determination condition is met, the UE 100 switches from WLAN communication to cellular communication.

The third determination condition for E-UTRAN target cell is as follows.

---

RSRPmeas > ThreshServingOffloadWLAN, HighP; and
RSRQmeas > ThreshServingOffloadWLAN, HighQ;

---

"ThreshServingOffloadWLAN, HighP" and "ThreshServingOffloadWLAN, HighQ" are included in the auxiliary information. "ThreshServingOffloadWLAN, HighP" and "ThreshServingOffloadWLAN, HighQ" are the thresholds for switching to the E-UTRAN 10.

The fourth determination condition for source WLAN is as follows.

---

ChannelUtilizationWLAN >ThreshChUtilWLAN, High; or
BackhaulRateDlWLAN <ThreshBackhRateDLWLAN, Low; or
BackhaulRateUlWLAN <ThreshBackhRateULWLAN, Low; or
BeaconRSSI < ThreshBeaconRSSIWLAN, Low;

---

Here, "ThreshChUtilWLAN, High," "ThreshBackhRateDLWLAN, Low," "ThreshBackhRateULWLAN, Low," and "ThreshBeaconRSSIWLAN, Low" are included in the auxiliary information, and are the thresholds for switching to the E-UTRAN 10.

(Radio Terminal)

Figure 3:
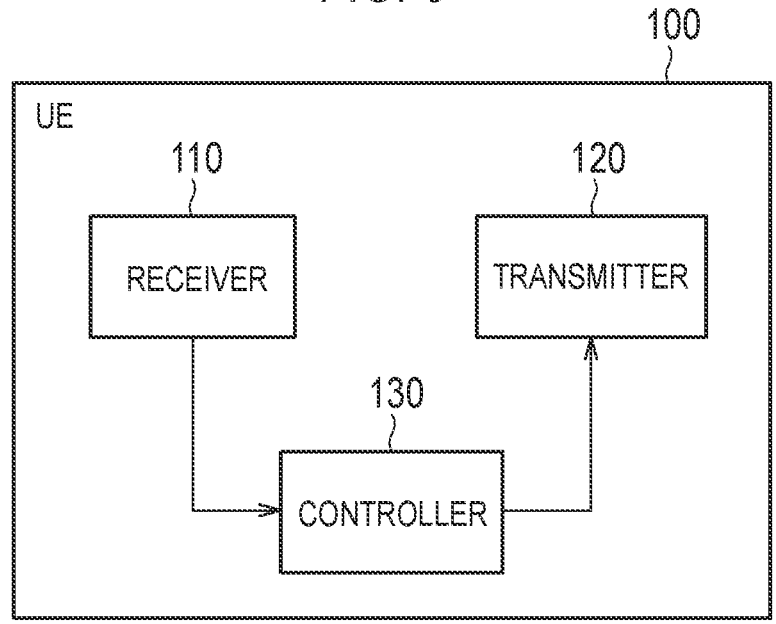
FIG. 3 is a block diagram illustrating a UE 100.

A configuration of the UE 100 (radio terminal) will be described below. FIG. 3 is a block diagram illustrating the UE 100.

As illustrated in FIG. 3, the UE 100 comprises a receiver 110, a transmitter 120, and a controller 130. The receiver 110 and the transmitter 120 may be integrated as a transceiver. The UE 100 may comprise the receiver 110 and the transmitter 120 commonly used for cellular communication and WLAN communication. The UE 100 may comprise a receiver 110 and a transmitter 120 for cellular communication, and a receiver 110 and a transmitter 120 for WLAN communication, respectively.

The receiver 110 performs various receptions under control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various transmissions under control of the controller 130. The transmitter 120 includes an antenna. The transmitter 120 converts a baseband signal (transmission signal) output by the controller 130 into a radio signal. The transmitter 120 transmits the radio signal from the antenna.

The controller 130 conducts various controls in the UE 100. The controller 130 can control the receiver 110 and the transceiver 120. The controller 130 includes a processor and a memory. The memory stores programs executed by the processor and information used in the processings by the processor. The processor includes a baseband processor and a central processing unit (CPU). The baseband processor performs modulating/demodulating, encoding/decoding, and the like on a baseband signal. The CPU executes the programs stored in the memory and performs various processings. The controller 130 performs various processings described below and various communication protocols described above.

(Base Station)

Figure 4:
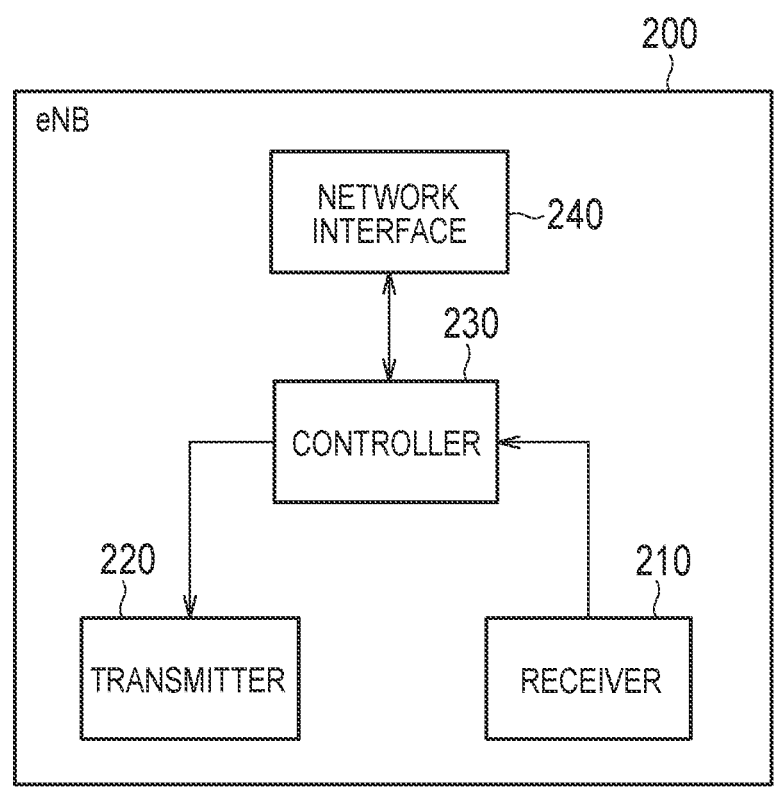
FIG. 4 is a block diagram illustrating an eNB 200.

A configuration of the eNB 200 (base station) will be described below. FIG. 4 is a block diagram illustrating the eNB 200.

As illustrated in FIG. 4, the eNB 200 comprises a receiver 210, a transmitter 220, a controller 230, and a network interface 240. The receiver 210 and the transmitter 220 may be integrated as a transceiver.

The receiver 210 performs various receptions under control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various transmissions under control of the controller 230. The transmitter 220 includes an antenna. The transmitter 220 converts a baseband signal (transmission signal) output by the controller 230 into a radio signal. The transmitter 220 transmits the radio signal from the antenna.

The controller 230 conducts various controls in the eNB 200. The controller 230 can control the receiver 210, the transmitter 220, and the network interface 240. The controller 230 includes a processor and a memory. The memory stores programs executed by the processor and information used in the processings by the processor. The processor includes a baseband processor and a central processing unit (CPU). The baseband processor performs modulating/demodulating, encoding/decoding, and the like on a baseband signal. The CPU executes the programs stored in the memory and performs various processings. The controller 230 performs various processings described below and various communication protocols described above.

The network interface 240 is connected to an adjacent eNB 200 via the X2 interface. The network interface 240 is connected to the MME/S-GW 300 via an S1 interface.

The network interface 240 is used for communication made on the X2 interface, communication made on the S1 interface, and the like.

The network interface 240 is connected to the WT 600 via the Xw interface. The network interface 240 is used for communication made on the Xw interface, and the like.

(Wireless LAN Access Point)

Figure 5:
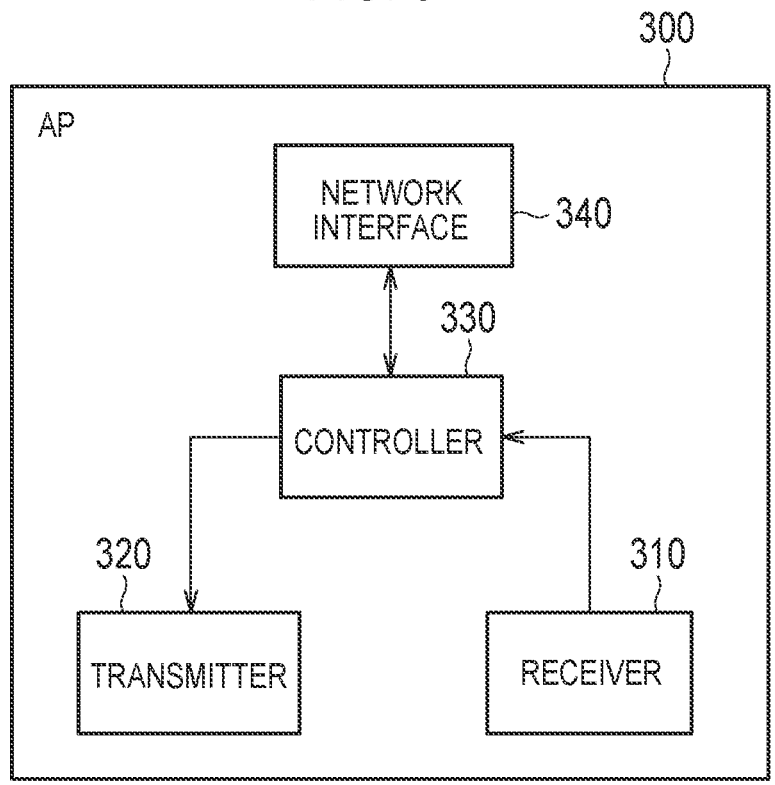
FIG. 5 is a block diagram illustrating an AP 300.

A configuration of the AP 300 (wireless LAN access point) will be described below. FIG. 5 is a block diagram illustrating the AP 300.

As illustrated in FIG. 5, the AP 300 comprises a receiver 310, a transmitter 320, a controller 330, and a network interface 340. The receiver 310 and the transmitter 320 may be integrated as a transceiver.

The receiver 310 performs various receptions under control of the controller 330. The receiver 310 includes an antenna. The receiver 310 converts a radio signal received by the antenna into a baseband signal (reception signal). The receiver 310 outputs the baseband signal to the controller 330.

The transmitter 320 performs various transmissions under control of the controller 330. The transmitter 320 includes an antenna. The transmitter 320 converts a baseband signal (transmission signal) output by the controller 330 into a radio signal. The transmitter 320 transmits the radio signal from the antenna.

The controller 330 conducts various controls in the AP 300. The controller 330 can control the receiver 310, the transmitter 320, and the network interface 340. The controller 330 includes a processor and a memory. The memory stores programs executed by the processor and information used in the processings by the processor. The processor includes a baseband processor and a central processing unit (CPU). The baseband processor performs modulating/demodulating, encoding/decoding, and the like on a baseband signal. The CPU executes the programs stored in the memory and performs various processings. The controller 330 performs various processings described below and various communication protocols described above.

The network interface 340 is connected to the backhaul via a predetermined interface. The network interface 340 is connected to the WT 600, and is used for communication with the WT 600, and the like.

(Wireless LAN Termination)

Figure 6:
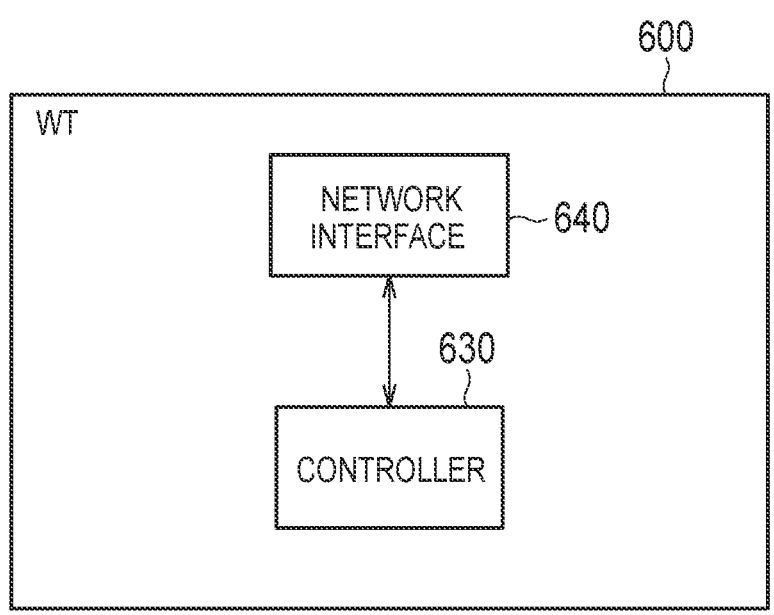
FIG. 6 is a block diagram illustrating a WT 600.

A configuration of the WT 600 (wireless LAN termination) will be described below. FIG. 6 is a block diagram illustrating the WT 600.

As illustrated in FIG. 6, the WT 600 comprises a controller 630 and a network interface 640.

The controller 630 conducts various controls in the WT 600. The controller 630 can control the network interface 640. The controller 630 includes a processor and a memory. The memory stores programs executed by the processor and information used in the processings by the processor. The processor includes a baseband processor and a central processing unit (CPU). The baseband processor performs modulating/demodulating, encoding/decoding, and the like on a baseband signal. The CPU executes the programs stored in the memory and performs various processings. The controller 630 performs various processings described below and various communication protocols described above.

The network interface 640 is connected to the backhaul via a predetermined interface. The network interface 640 is connected to the APs 300, and is used for communication with the APs 300.

The network interface 640 is connected to the eNB 200 via the Xw interface. The network interface 640 is used for communication made on the Xw interface.

First Embodiment

Figures 8A, 8B:
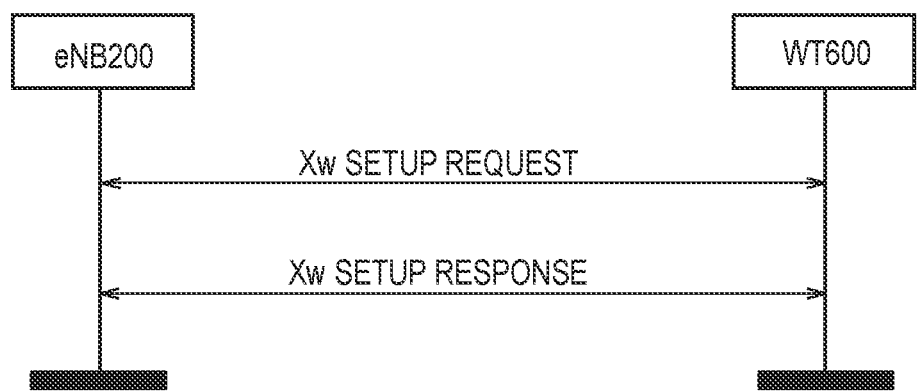
FIGS. 8A and 8B are sequence diagrams for explaining the operation (1) according to the first embodiment.
Figures 9A, 9B:
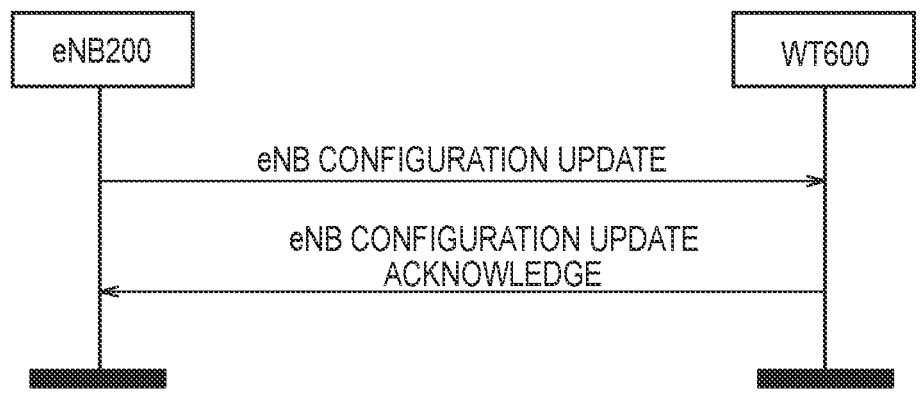
FIGS. 9A and 9B are sequence diagrams for explaining the operation (2) according to the first embodiment.
Figure 10:
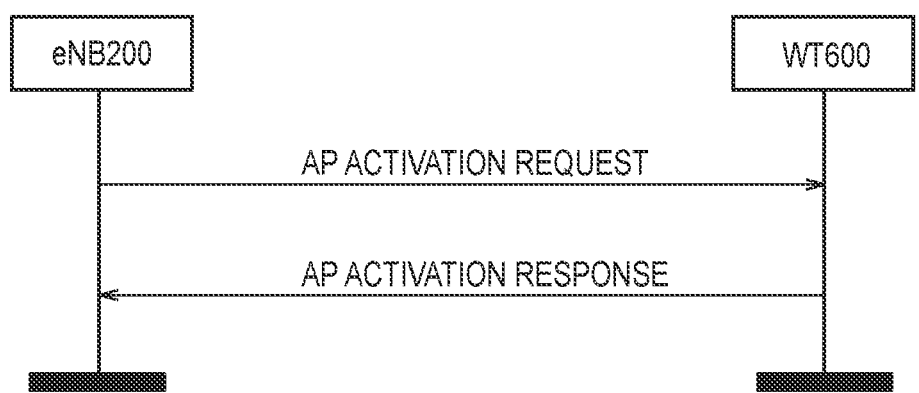
FIG. 10 is a sequence diagram for explaining the operation (3) according to the first embodiment.
Figure 11:
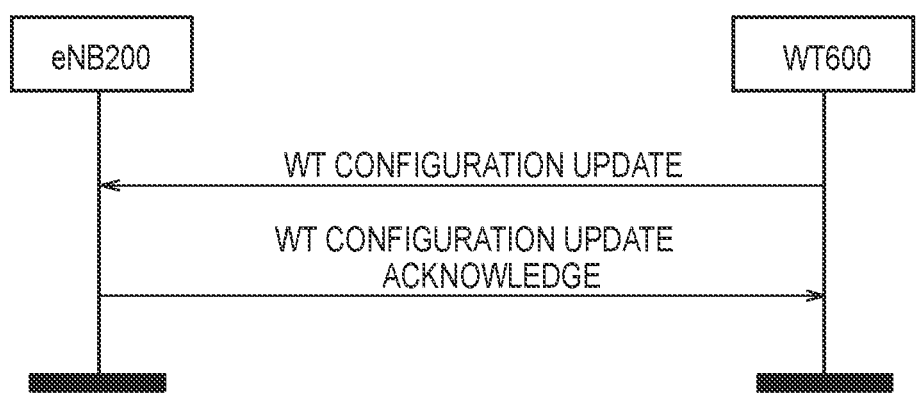
FIG. 11 is a sequence diagram for explaining the operation (4) according to the first embodiment.
Figure 12:
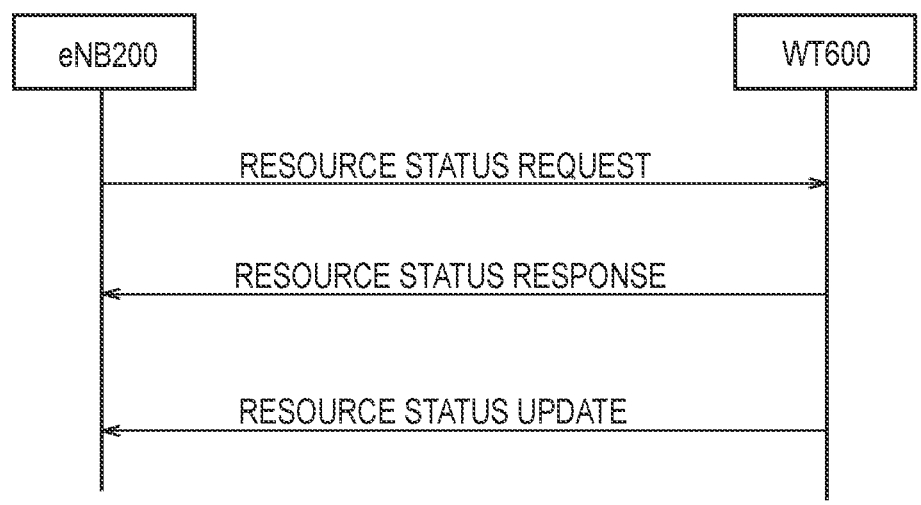
FIG. 12 is a sequence diagram for explaining the operation (5) according to the first embodiment and operations according to the second embodiment.

A first embodiment will be described below with reference to FIG. 7 to FIG. 12. FIG. 7 is a diagram for explaining an operation environment according to the first embodiment. FIG. 8A is a sequence diagram for explaining the operation (1) according to the first embodiment. FIG. 8B is a diagram for explaining the operation (1) according to the first embodiment. FIG. 9A is a sequence diagram for explaining the operation (2) according to the first embodiment. FIG. 9B is a diagram for explaining the operation (2) according to the first embodiment. FIG. 10 is a sequence diagram for explaining the operation (3) according to the first embodiment. FIG. 11 is a sequence diagram for explaining the operation (4) according to the first embodiment. FIG. 12 is a sequence diagram for explaining the operation (5) according to the first embodiment.

As illustrated in FIG. 7, the eNB 200 manages a cell. A plurality of APs 300 are positioned within the cell managed by the eNB 200.

The eNB 200 grasps the APs 300 positioned in the cell of the eNB 200. For example, the eNB 200 may grasp the APs 300 positioned within the cell of the eNB 200 by a report of the APs 300 from the UE 100. The eNB 200 may grasp the APs 300 positioned within the cell of the eNB 200 by receiving the information on the APs 300 managed by the WT 600 from the WT 600.

The eNB 200 manages the APs 300 positioned within the cell of the eNB 200 per group. The eNB 200 groups the APs 300. That is, the eNB 200 sets AP groups to which each AP 300 belongs. According to the present embodiment, as illustrated in FIG. 7, the eNB 200 sets the AP 300-1A to the AP 300-3A in the AP group A. The eNB 200 sets the AP 300-1B to the AP 300-5B in the AP group B. Thus, the AP 300-1A to the AP 300-3A belong to the AP group A. The AP 300-1B to the AP 300-5B belong to the AP group B.

The eNB 200 may set the AP groups on the basis of the capability of the APs. The eNB 200 sets the AP groups to which the APs 300 belong on the basis of the frequency band at which the APs 300 operate, for example. The eNB 200 may set the APs 300 operating at the same frequency band in the same AP group. The eNB 200 may set the APs 300 operating at different frequency bands in the same AP group such that the UE 100 can use a plurality of frequency bands.

The eNB 200 may set the AP groups on the basis of the report of the APs 300 from the UE 100. For example, when detecting a radio signal (beacon signal) from the AP 300, the UE 100 can transmit a report including the identification information on the detected AP 300 to the eNB 200. The eNB 200 specifies a plurality of mutually-adjacent APs 300 on the basis of the report from the UE 100. The eNB 200 may then set the mutually-adjacent APs 300 in the same group. When the report from the UE 100 includes information on when the AP 300 is detected, information on the reception intensity of the radio signal of the AP 300, and the like, the eNB 200 may set the AP groups to which the APs 300 belong on the basis of the information on the time and/or the information on the reception intensity.

Further, the OAM 500 may group a plurality of APs 300. The OAM 500 can group similarly to the eNB 200. The OAM 500 receives the information required for grouping (such as the report from the UE 100) from the eNB 200 and/or the WT 600 thereby to perform grouping. The OAM 500 sends the configuration information including the information on the AP groups and the APs 300 belonging to the AP groups to the eNB 200. The eNB 200 sets the AP groups on the basis of the configuration information.

The eNB 200 sends the AP group information on the AP groups set in the eNB 200 to the WT 600. The WT 600 can know the AP groups set in the eNB 200 on the basis of the AP group information. Thereby, the WT 600 can manage its managing APs 300 in units of group similarly to the eNB 200.

When the eNB 200 (or the EPC 20) manages each AP 300 in units of group configured of the AP(s) 300, the WT 600 may not know the AP groups to which each AP 300 belongs set in the eNB 200. Thus, the eNB 200 can send the AP group information to the WT 600 in at least any method of the following methods.

(A) Xw Setup Procedure

As illustrated in FIG. 8A, when setting up the Xw interface between the eNB 200 and the WT 600, the eNB 200 can send the AP group information to the WT 600. That is, the eNB 200 can send the AP group information to the WT 600 in the Xw setup procedure. The Xw setup procedure is directed for exchanging the configuration data required for the eNB 200 and the WT 600 in order to accurately perform mutual operations on the Xw interface.

For example, the eNB 200 sends an Xw setup request message including the AP group information to the WT 600. The Xw setup request message is directed for starting the Xw setup procedure. The Xw setup request message is directed for transferring the information required to set the Xw interface.

As illustrated in FIG. 8B, the AP group information includes the identification information (AP ID) of the APs 300 and the identification information (Group ID) of the groups to which the APs 300 belong. AP ID corresponds to the WLAN identifier (such as SSID, BSSID, ESSID, or HESSID).

Group ID may be associated with the information (Served APs List) on a list of APs included in the groups indicated by Group ID. The AP group information may include the information (Served AP groups List) on a list of AP groups managed by the eNB 200. The AP group list information may include the information (Served APs List) on a list of APs in each group. For example, the AP group information includes the information on the lists of APs in the "AP group A" and "AP group B." The information on the list of APs in the AP group A includes the identifiers of the AP 300-1A, the AP 300-2A, and the AP 300-3A.

When receiving the Xw setup request message from the WT 600, the eNB 200 may send an Xw setup response message including the AP group information to the WT 600. The Xw setup response message is a response message to the Xw setup request. The Xw setup response message is directed for transferring the information required to set the Xw interface.

(B) eNB Configuration Update Procedure

As illustrated in FIG. 9A, when the AP group information is updated, the eNB 200 can send the AP group information to the WT 600. That is, the eNB 200 can send the AP group information to the WT 600 in the eNB configuration update procedure. The eNB configuration update procedure is directed for updating the configuration data required for the eNB 200 and the WT 600 in order to accurately perform mutual operations on the Xw interface.

For example, the eNB 200 sends an eNB configuration update (ENB CONFIGURATION UPDATE) message including the AP group information to the WT 600. The eNB configuration update message is directed for transferring the updated information. The eNB configuration update message may be an existing eNB configuration update message extended to include the AP group information. The eNB configuration update message may be newly defined in order to transfer the updated information to the WT 600.

As illustrated in FIG. 9B, the eNB configuration update message may include the information (Served AP groups To Add) on the AP group added as the AP group managed by the eNB 200. The information on the added AP group can include similar information as in "(A) Xw setup procedure" described above (see FIG. 8B).

The eNB 200 may send the eNB configuration update message including the information (Served AP groups To Modify) on the modified AP groups to the WT 600. For example, when an AP 300 is newly added to an existing AP group, or an AP 300 belonging to an existing AP group is added to another AP group, the eNB 200 may include the information on the modified AP groups including the identification information on the AP 300 and the identification information on the group to which the AP 300 belongs in the eNB configuration update message. When the AP 300 is deleted from the AP group, the eNB 200 may include the identification information on the deleted AP 300 in the eNB configuration update message. The eNB 200 may include or may not include the identification information on the AP group to which the deleted AP 300 belongs in the eNB configuration update message.

The eNB 200 may send the eNB configuration update message including the information (Served AP groups to Delete) on a deleted AP group to the WT 600. For example, when the AP group is deleted, the eNB 200 can include the information on the deleted AP group including the identification information on the deleted AP group in the eNB configuration update message.

Even when the AP group information is not updated, the eNB 200 may send the eNB configuration update message including the AP group information to the WT 600. For example, when not having sent the AP group information to the WT 600, the eNB 200 may send the AP group information in the eNB configuration update message.

(C) AP Activation Procedure/AP Deactivation Procedure

As illustrated in FIG. 10, when sending a request to activate the AP 300 to the WT 600, the eNB 200 can send the AP group information together with the request. That is, the eNB 200 can send the AP group information to the WT 600 in the AP activation procedure. The AP activation procedure is directed for requesting the WT 600 to switch a deactivated AP 300 on.

For example, the eNB 200 sends an AP activation request (AP ACTIVATION REQUEST) message including the AP group information to the WT 600. The AP activation request message is directed for activating a deactivated AP 300. The AP activation request message may be directed for activating a switched-off AP 300 (or a switched-off communication machine (transmitter and/or receiver) provided in the AP 300).

The AP activation request message includes the activated AP information on the AP 300 to be activated. The activated AP information may be the identification information on the AP 300 or the identification information on the AP group. The activated AP information may be directed for designating a frequency band at which the AP 300 operates. When the activated AP information is the identification information on the AP 300, the WT 600 activates the AP 300. When the activated AP information is the identification information on the AP group, the WT 600 activates all the APs 300 belonging to the AP group. When the activated AP information is directed for designating a frequency band, the WT 600 activates all the APs 300 operating at the frequency band. When the AP 300 operates at a plurality of frequency bands, the WT 600 may control such that the AP 300 operates only at the designated frequency. For example, when the activated AP information is directed for designating 2.4 GHz, the WT 600 activates the AP 300 operating at the 2.4 GHz band. When the activated AP information is directed for designating 5 GHz for the AP group A, the WT 600 activates all the APs 300 operating at the 5 GHz band belonging to the AP group A. The APs 300 belonging to the AP group A restart operating at the 5 GHz band. When the activated AP information is directed for designating 5 GHz for a predetermined AP 300, the WT 600 activates only the AP 300 (such as the AP 300-1A). The AP 300-1A restarts operating at the 5 GHz band.

The AP activation request message can include the AP group information described above as AP group information managed by the eNB 200.

When sending a request to deactivate the AP 300 to the WT 600, the eNB 200 can send the AP group information together with the request. That is, the eNB 200 can send the AP group information to the WT 600 in the AP deactivation procedure. The AP deactivation procedure is directed for requesting the WT 600 to switch an activated AP 300 off.

For example, the eNB 200 sends an AP deactivation request message including the AP group information to the WT 600. The AP deactivation request message is directed for deactivating an activated AP 300. The AP deactivation request message may be directed for switching a switched-on AP 300 (or the switched-on communication machine (transmitter and/or receiver) provided in the AP 300) off.

The AP deactivation request message includes the deactivated AP information on the AP 300 to be deactivated. The deactivated AP information is a similar kind of information to the activated AP information. The AP deactivation request message can include the AP group information described above as AP group information managed by the eNB 200.

(D) WT Configuration Update Procedure

As illustrated in FIG. 11, when updating information, the WT 600 can send the updated information to the eNB 200. Specifically, the WT 600 can send a WT configuration update message including the updated information to the eNB 200 in the WT configuration update procedure. The WT configuration update message is directed for transferring the updated information.

For example, when the information (list) of the APs 300 managed by the WT 600 is updated, the WT 600 sends the updated information to the eNB 200. For example, when a new AP 300 is added, when the AP 300 is deleted from the list, or when the configuration of the AP 300 is modified, the information on the APs 300 is updated. For example, when an activated AP 300 is switched to deactivated, the WT 600 modifies the configuration of the AP 300. Similarly, when a deactivated AP 300 is switched to activated, the WT 600 modifies the configuration of the AP 300. In this case, the WT 600 can send the information on (the communication machine of) the activated AP 300 or deactivated AP 300 as updated information to the eNB 200. When the switching is performed on the basis of the message from the eNB 200, the WT 600 may omit sending the updated information to the eNB 200. When the operation frequency band of the AP 300 is modified or the position of the AP 300 is modified, the WT 600 modifies the configuration of the AP 300.

The eNB 200 can send the AP group information to the WT 600 in response to the reception of the updated information. That is, the eNB 200 can send the AP group information to the WT 600 in the WT configuration update procedure. The WT configuration update procedure is directed for updating the configuration date required for the eNB 200 and the WT 600 in order to accurately perform mutual operations on the Xw interface.

For example, the eNB 200 sends a WT configuration update acknowledge (WT CONFIGURATION UPDATE ACKNOWLEDGE) message including the AP group information to the WT 600. The WT configuration update acknowledge message is directed for acknowledging (ACK) the updated information. For example, when the WT configuration update message includes the information on a newly-added AP 300, the eNB 200 can set an AP group to which the added AP 300 belongs. The eNB 200 can send the WT configuration update acknowledge message including the identification information on the AP group to which the added AP 300 belongs.

The WT configuration update acknowledge message can include the AP group information described above as information on the AP groups managed by the eNB 200.

(E) Resource Status Request Procedure

As illustrated in FIG. 12, the eNB 200 can send the AP group information together with a request to report the resource statuses of the APs 300 to the WT 600. That is, the eNB 200 can send the AP group information to the WT 600 in the resource status request procedure. The resource status request procedure is directed for requesting to report the load measurements of the APs 300 managed by the WT 600.

For example, the eNB 200 sends a resource status request message including the AP group information to the WT 600. The resource status request message is directed for causing the WT 600 to start making a requested measurement according to the parameters given in the message. The resource status request message may be an existing resource status request message extended to include the AP group information. The resource status request message may be newly defined to request the resource status to the WT 600.

The resource status request message can include the AP group information described above as AP group information managed by the eNB 200. The resource status request message may be directed for requesting to report the resource statuses of the APs in units of AP group as described below.

As described above, the eNB 200 can send the AP group information set in the eNB 200 to the WT 600. The WT 600 can receive the AP group information set in the eNB 200. Thereby, the WT 600 can know the AP group information. Consequently, the WT 600 can manage the APs 300 in units of group set in the eNB 200.

The eNB 200 can notify the set AP group information to the UE 100. The UE 100 can perform UE based traffic steering on the other APs 300 in the AP group to which the AP 300 connected (communicated) with the UE 100 belongs. When starting connecting to (performing traffic steering on) the WLAN 30 or when performing traffic steering on the APs 300 belonging to another AP group, the UE 100 may not be able to perform traffic steering without a command from the eNB 200.

For example, in FIG. 7, when first starting traffic steering on the AP 300-1A, the UE 100-1 may need a traffic steering command from the eNB 200. The UE 100-1 receives the traffic steering command from the eNB 200, and then starts traffic steering. Thus, even when the determination conditions for switching from cellular communication to WLAN communication are met on the basis of the auxiliary information, the UE 100-1 does not autonomously perform traffic steering. For example, the UE 100-1 does not autonomously perform traffic steering from the AP group A to the AP group B.

It is assumed that the UE 100-2 has already performed traffic steering to the AP 300-1B. The UE 100-2 determines that the AP 300-1B and the AP 300-2B belong to the same AP group B on the basis of the AP group information from the eNB 200. When the determination conditions for the AP 300-2B are met, the UE 100-2 can start traffic steering without receiving the traffic steering command from the eNB 200. That is, when the UE 100-2 performs traffic steering on the APs 300 belonging to the same AP group, the traffic steering command from the eNB 200 may not be required.

Second Embodiment

A second embodiment will be described below with reference to FIG. 12 to FIG. 14. FIG. 12 is a sequence diagram for explaining operations according to the second embodiment. FIG. 13 is a diagram for explaining operations according to the second embodiment. FIG. 14 is a diagram for explaining operations according to the second embodiment.

The first embodiment has been described assuming that the eNB 200 sends the AP group information to the WT 600. The second embodiment will be described assuming that the WT 600 sends a report of the AP resource statuses in units of AP group to the eNB 200. The description of the similar parts as in the first embodiment will be omitted as needed.

As described in the first embodiment, it is assumed that the UE 100 performs autonomous traffic steering on the APs 300 in the same AP group without a command from the eNB 200. In this case, it is likely that the UE throughput of the UE 100 may not be guaranteed for a newly-connected AP 300 owing to the absence of a command from the eNB 200. Thus, the UE throughput can be guaranteed in units of group with the following technique.

As illustrated in FIG. 12, the eNB 200 sends a resource status request message to the WT 600. The resource status request message is directed for requesting to report of the resource statuses of the APs in units of AP group.

For example, as illustrated in FIG. 13, the resource status request message may include information on an AP group to report (Group To Report/Group To Report Item). The AP group information may include the group identification information (Group ID). The resource status request message may include the identification information (AP ID) of the APs 300 belonging to the AP group to report. The resource status request message may include at least either a type of the resource status included in the report or a reporting periodicity to send the report to the eNB 200.

The type of the resource status is information for designating at least any of BSS load (Basic Service Set load), UE average data rate, BSS average access delay, BSS AC access delay, and WLAN metrics. BSS load is at a current air traffic level or more. UE average data rate is an average data rate (in uplink and/or downlink) of the UE 100 connected to the AP 300, which is calculated by the AP 300. BSS average access delay is a scalar indication of a relative level of BSS load in the AP 300. BSS average access delay in the AP 300 is an average access delay after a packet (DCF or EDCAF MPDU) is prepared for transmission until the frame in which the packet is transmitted. BSS AC access delay is a scalar indication at a relative level of BSS load in an access controller (AC). BSS AC access delay is an average access delay in the AC after a packet (DCF or EDCAF MPDU) is prepared for transmission until the frame in which the packet is transmitted. WLAN metrics is information on WAN (backhaul) speed and load of uplink and/or downlink of the AP 300.

The WT 600 sends a resource status response (RESOURCE STATUS RESPONSE) message to the eNB 200. The WT 600 can send the resource status response message including the report of the resource statuses in units of AP group to the eNB 200. The resource status response message indicates that the requested measurement is normally started on all or part (subset) of the measurement targets. The WT 600 measures the resource statuses of the APs 300 and reports the measurement result to the eNB 200.

As illustrated in FIG. 14, the resource status response message may include a report of the resource statuses in units of AP group (Group Measurement Result/AP Measurement Result). The report of the resource statuses in unis of AP group (Group Measurement Result) may include a statistical value calculated on the basis of the resource status of each AP 300 configuring the AP group as a value indicating the resource status in units of AP group. The statistical value may be an average value of the resource statuses of the APs 300. The statistical value may be the minimum value of the resource statuses of the APs 300 in the same group. The WT 600 may be directed for the resource statuses of the activated APs 300 and may not be directed for the resource statuses of the deactivated APs 300 when calculating the statistical value. The report of the resource statuses in units of AP group (AP Measurement Result) may include a value indicating the resource status of each AP 300 configuring the AP group as a value indicating the resource status in units of AP group. "AP Measurement Result" may include the values indicating the resource statuses of all the APs 300 configuring the AP groups. "AP Measurement Result" may include only the values indicating the resource statuses of the activated APs 300 among the APs 300 configuring the AP groups. The WT 600 can include the report of the resource status designated by the eNB 200 in the report depending on the type of the resource status.

The resource status response message may include, as the resource status of the AP 300, at least any of BSS load (Basic Service Set load), UE average data rate, BSS average access delay, BSS AC access delay, and WLAN metrics.

As illustrated in FIG. 12, the WT 600 sends a resource status update message. The WT 600 can send the resource status update message including the report of the resource statuses in units of AP group to the eNB 200. The resource status update message is directed for reporting the requested measurement result.

The resource status update message can include similar information to the above resource status response message (see FIG. 14). The WT 600 can report the resource status update message at a cycle based on the reporting periodicity included in the resource status request message.

The eNB 200 receives the resource status response message and/or the resource status update message based on the resource status request message. Thereby, the eNB 200 receives the report of the resource statuses of the APs in units of AP group from the WT 600. The eNB 200 determines whether to send a traffic steering command to the UE 100 in consideration of the resource statuses of the APs in units of AP group. When receiving the value indicating the resource status of each AP 300 belonging to the AP groups, the eNB 200 can calculate a statistical value (such as average value) in units of AP group similarly to the above WT 600. The eNB 200 determines whether to send a traffic steering command to the UE 100 in consideration of the calculated resource statuses of the APs in units of AP group.

When the resource statuses of the APs in units of AP group meet the (requested) UE throughput (for example, when the resource statuses of the APs in units of AP group exceed the threshold), the eNB 200 sends a traffic steering command to the UE 100. Otherwise, the eNB 200 stops sending a traffic steering command to the UE 100.

As described above, the WT 600 sends the report of the resource statuses of the APs in units of AP group to the eNB 200, and the eNB 200 receives the report from the WT 600. The eNB 200 can determine whether to send a traffic steering command to the UE 100 not only in consideration of only the resource status of the AP 300 to be subjected to traffic steering by the UE 100 but also in consideration of the resource statuses of the APs in the AP group to which the AP 300 to be subjected to traffic steering belongs. Thereby, even when autonomously performing traffic steering in the same group, the UE 100 can guarantee the UE throughput.

(Variant)

A variant of the second embodiment will be described. The second embodiment described above is such that the eNB 200 makes a determination on the basis of the resource statuses of the APs in units of AP group, but is not limited thereto. The WT 600 may make a determination for a request from the eNB 200 on the basis of the resource statuses of the APs in units of AP group.

For example, it is assumed that the eNB 200 sends, to the WT 600, a request of cellular/WLAN aggregation as a technique for exchanging data of the UE 100 by use of both cellular communication (LTE communication) and WLAN communication.

Cellular/WLAN aggregation is a communication system for exchanging data (traffics) of the UE 100 by use of both cellular communication and WLAN communication. Specifically, traffics (user data) belonging to the same or different data bearers are exchanged by use of both cellular communication and WLAN communication in cellular/WLAN aggregation.

When cellular/WLAN aggregation is performed, a first data bearer via the eNB 200 not via the APs 300 and a second data bearer via the APs 300 and the eNB 200 are established between the UE 100 and the SGW 400 (EPC 20). When cellular/WLAN aggregation is performed, only the second data bearer may be established. When cellular/WLAN aggregation is performed, both the first data bearer and the second data bearer may be established.

The first data bearer is a data bearer for normal cellular communication. The second data bearer is a data bearer for cellular/WLAN aggregation. The second data bearer is split in the eNB 200 (such as PDCP layer). One of the split parts (second data bearer 1) terminates at the UE 100 not via the APs 300. The other of the split parts (second data bearer 2) terminates at the UE 100 via the APs 300. The second data bearer 2 may terminate at the UE 100 via not only the APs 300 but also the WT 600.

When performing cellular/WLAN aggregation, the UE 100 exchanges data by use of at least the second data bearer.

Specifically, when cellular/WLAN aggregation is performed, the eNB 200 divides the data belonging to the second data bearer into data to be transmitted in cellular communication (cellular data) and data to be transmitted in WLAN communication (WLAN data) in the downlink. The eNB 200 transmits the cellular data to the UE 100 in cellular communication via the second data bearer 1. The eNB 200 transmits the WLAN data to the AP 300 in a direct communication path. The AP 300 transmits the WLAN data received from the eNB 200 to the UE 100 in WLAN communication via the second data bearer 2.

The UE 100 divides the data belonging to the second data bearer into data to be transmitted in cellular communication (cellular data) and data to be transmitted in WLAN communication (WLAN data) in the uplink. The UE 100 transmits the cellular data to the eNB 200 in cellular communication via the second data bearer 1. The UE 100 transmits the WLAN data to the AP 300 in WLAN communication via the second data bearer 2. The AP 300 transmits the WLAN data received from the UE 100 to the eNB 200 in a direct communication path. The eNB 200 combines (reconstructs)

the cellular data received from the UE 100 and the WLAN data received from the AP 300, and transmits the combined (reconstructed) data to the SGW 400.

All the data belonging to the second data bearer may be exchanged in cellular communication in cellular/WLAN aggregation. All the data belonging to the second data bearer may be exchanged in WLAN communication in cellular/WLAN aggregation.

The eNB 200 sends a cellular/WLAN aggregation request including the identification information on the AP 300 to be subjected to cellular/WLAN aggregation to the WT 600 in order to perform cellular/WLAN aggregation. The WT 600 which receives the cellular/WLAN aggregation request determines whether to accept cellular/WLAN aggregation on the basis of the resource statuses of the APs in units of AP group. Thus, the WT 600 determines whether to accept cellular/WLAN aggregation in consideration of not only the resource status of the AP 300 indicated by the identification information but also the resource status of the AP group to which the AP 300 belongs.

If the resource statuses of the other APs in the same AP group do not meet the UE throughput even when the resource status of the AP 300 indicated by the identification information meets the (requested) UE throughput, the WT 600 may reject the cellular/WLAN aggregation request. Thus, the WT 600 can send a response (ACK/NAK) to the cellular/WLAN aggregation request to the eNB 200 on the basis of the resource status of the AP group. The response may include the reason information indicating that the resource status of the AP group is a cause.

Thereby, even when the UE 100 which performs cellular/WLAN aggregation autonomously performs traffic steering in the same group, the UE throughput can be guaranteed.

Third Embodiment

Figure 15:
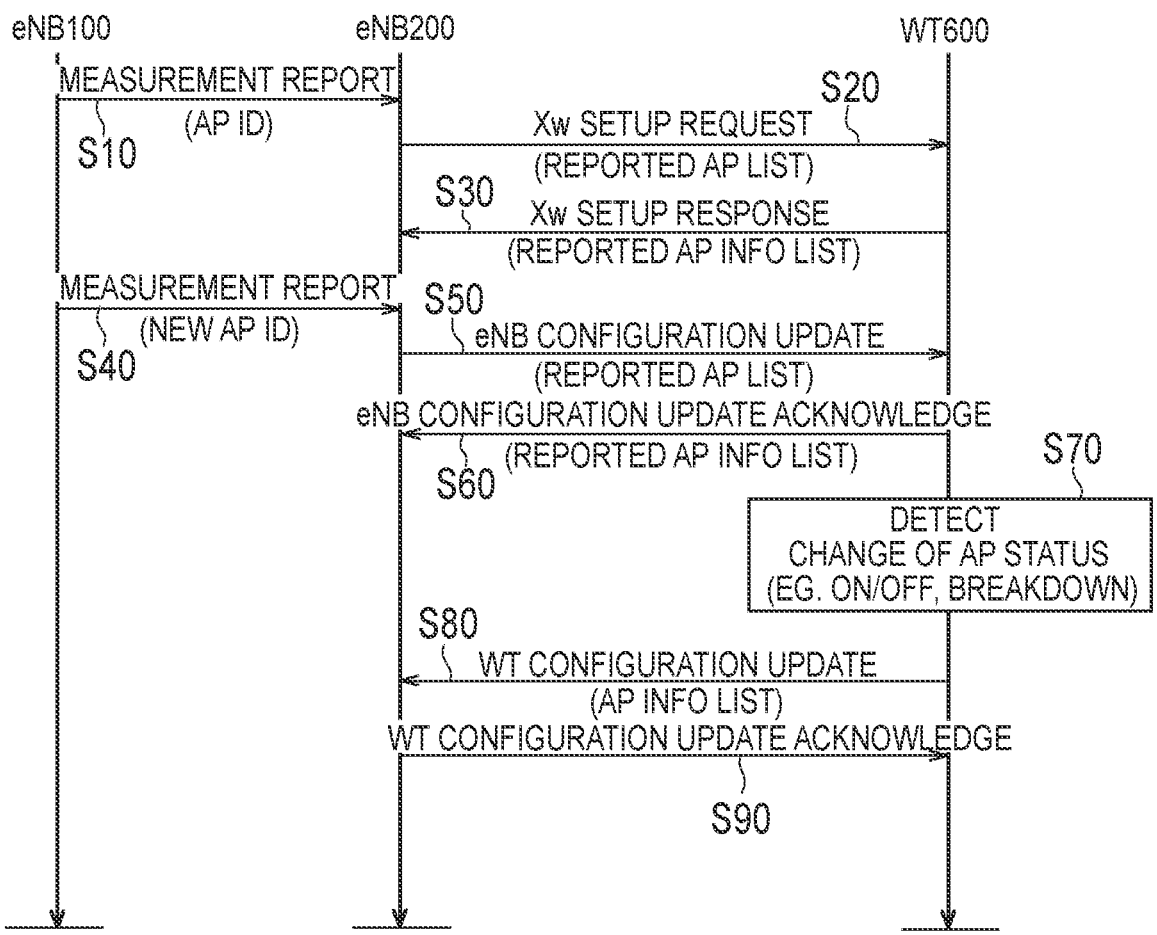
FIG. 15 is a sequence diagram for explaining operations according to a third embodiment.

A third embodiment will be described with reference to FIG. 15 and FIG. 16. FIG. 15 is a sequence diagram for explaining operations according to the third embodiment. FIG. 16A and FIG. 16B are diagrams for explaining operations according to the third embodiment.

The first embodiment has been described assuming that the eNB 200 sends the AP group information to the WT 600. The third embodiment will be described assuming that the WT 600 sends the AP group information to the eNB 200. The description of the similar parts as in the first and second embodiments (including the variant) will be omitted as needed.

As illustrated in FIG. 15, in step S10, the UE 100 transmits a report of the APs 300 (Measurement report) to the eNB 200. The eNB 200 receives the report of the APs 300 from the UE 100. As described above, the report of the APs 300 can include the identification information (AP ID) of the AP 300 detected by the UE 100.

In step S20, the eNB 200 can send the information on the APs 300 reported from the UE 100 to the WT 600. Specifically, the eNB 200 can send an Xw setup request message including the information of the APs 300 to the WT 600. For example, as illustrated in FIG. 16A, the Xw setup request message includes a list of APs 300 (Reported AP list) reported from the UE 100. The list of APs 300 includes the identification information on the APs 300. The list may be a list of APs 300 reported from one UE 100. The list may be a list of APs 300 reported from a plurality of UEs 100. The Xw setup request message may of course include not only the information on the APs 300 but also other information (such as identifier of the eNB 200-1 (Global eNB ID), information on cells managed by the eNB 200 (Served Cells), and a list of all pools to which the eNB 200 belongs (GU Group Id List)) (see FIG. 16A).

The WT 600 receives the Xw setup request message from the eNB 200. Thereby, the WT 600 receives the information on the APs 300 from the eNB 200. The WT 600 specifies the AP groups to which each AP 300 indicated by the information on the APs 300 belongs.

Additionally, the AP groups may be previously set by an operator (such as operator managing WLAN (AP, WT)). The WT 600 may set the AP groups. For example, the WT 600 may set the AP groups to which each AP 300 belongs similarly to the eNB 200 in the first embodiment.

In step S30, the WT 600 can send the AP group information (Reported AP Info list) on the AP groups to which each AP 300 belongs to the eNB 200. Specifically, the WT 600 can send an Xw setup response message including the AP group information to the eNB 200. The eNB 200 can receive the AP group information from the WT 600.

For example, as illustrated in FIG. 16B, the Xw setup response message includes a list (AP group ID List) of AP groups to which each AP 300 belongs notified from the eNB 200. The List of AP groups (AP group ID List) includes the information on each AP group. The list of AP groups may include the identification information (Group ID) of the AP groups to which each AP 300 belongs notified from the eNB 200. The AP group identification information may be associated with the information (AP ID List) on the APs 300 belonging to the groups. AP ID List includes the identification information on the APs 300. AP ID List may correspond to only each AP 300 notified from the eNB 200. AP ID List may include the information on each AP 300 notified from the eNB 200 and the information on the other AP(s) 300 except the AP 300 notified from the eNB 200. That is, AP ID List may include not only the information on each AP 300 notified from the eNB 200 but also the information on the other APs 300 belonging to the groups. The message notified from the WT 600 to the eNB 200 may include the information (identification information on the APs 300) on all the APs 300 belonging to the AP groups notified to the eNB 200.

For example, it is assumed that the AP 300-1A, the AP 300-2A, and the AP 300-3A belong to the AP group A. Even when only the AP 300-1A is notified from the eNB 200, the WT 600 can notify the information on all of the AP 300-1A, the AP 300-2A, and the AP 300-3A as the APs belonging to the AP group A to the eNB 200.

In this way, the WT 600 can send, as the AP group information, the information on each AP 300 notified from the eNB 200 (or each AP 300 reported from the UE 100 to the eNB 200), and the information on the other APs 300 except the AP 300 belonging to the same group as the AP 300 (or the other APs 300 not reported from the UE 100 to the eNB 200) to the eNB 200. For example, the WT 600 may send the information on all the APs 300 belonging to the AP groups to the eNB 200. The eNB 200 can receive, as the AP group information, the information on each AP 300 reported from the UE 100 and the information on the other APs 300 except the AP 300 belonging to the same group as the AP 300 (or the other APs 300 not reported from the UE 100 to the eNB 200) from the WT 600. The eNB 200 can receive the information on all the APs 300 belonging to the AP groups as the AP group information from the WT 600. The Xw setup response message may include not only the information on the APs 300 but also other information (such as the identifier of the WT 600 (Global WT ID) and criticality diagnostics) (see FIG. 16B). "Criticality diagnostics" may be interpreted (understood) as "error diagnostics."

The eNB 200 can set the AP groups to which each AP 300 belongs on the basis of the AP group information received from the WT 600. The eNB 200 can notify the set AP group information to the UE 100.

In step S40, the UE 100 transmits the report of the APs 300 to the eNB 200 similarly to in step S10. When detecting the AP 300 not reported to the eNB 200 in step S10, the UE 100 may transmit the report to the eNB 200. Thus, the UE 100 may transmit the report to the eNB 200 in order to report the newly-detected AP 300. The UE 100 may include only the identification information on the newly-detected AP 300 in the report. The UE 100 may include the identification information on the APs 300 logged by the UE 100 in the report. The UE 100 may discard the reported information on the APs 300 after transmitting the report to the eNB 200.

In step S50, the eNB 200 can send the information on the APs 300 reported from the UE 100 to the WT 600. Specifically, the eNB 200 can send an eNB configuration update message including the information on the APs 300 to the WT 600. The eNB configuration update message can include similar information as in step S20.

When the APs 300 reported from the UE 100 are included in the AP group information received from the WT 600, the eNB 200 may omit the processing in step S50.

In step S60, the WT 600 can send the AP group information on the AP groups to which each AP 300 belongs notified from the eNB 200 in step S50 to the eNB 200. Specifically, the WT 600 can send an eNB configuration update acknowledge message including the AP group information to the eNB 200. The eNB configuration update acknowledge message can include similar information as in step S30.

In step S70, the WT 600 detects a change in the situation of the APs 300 (or groups of APs 300) managed by the WT 600. In this case, the WT 600 performs the processing in step S80. When updating the information on the APs 300 (such as list) managed by the WT 600 in response to the change in the situation of the APs 300 managed by the WT 600, the WT 600 may perform the processing in step S80. The WT 300 may detect a change in the situation of the APs 300 in the following cases, for example.

AP 300 is deactivated
    AP 300 is activated
    WT 600 enters uncommunicable with AP 300 (due to failure of AP 300, for example)
    WT 600 enters communicable with AP 300 (due to recovery of AP 300, for example)
    More APs 300 are managed
    Less APs 300 are managed
    Group to which AP 300 belongs is changed In step S80, the WT 600 can send the AP group information (AP Info list) on the AP 300 changing in its situation to the eNB 200. Specifically, the WT 600 can send a WT configuration update message including the AP group information to the eNB 200.

The WT 600 specifies the eNB 200 managing the information on the AP 300 changing in its situation, and may send the AP group information to the specified eNB 200. The WT 600 may specify the eNB 200 which transmitted the identification information on the AP 300 changing in its situation in the past as the eNB 200 to transmit. The WT 600 may specify the eNB 200 which transmitted the information on the group to which the AP 300 changing in its situation belongs in the past as the eNB 200 to transmit.

The WT 600 may transmit the information on the situation of the AP 300 as the AP group information to the eNB 200 in addition to the identifier of the AP 300 changing its situation. For example, the information on the situation of the AP 300 is information indicating at least any of "deactivate," "activate," "uncommunicable," "communicable," "AP added to group," and "AP deleted from group."

In this way, the WT 600 can send the AP group information (particularly the information on an updated AP 300) to the eNB 200 in response to update of the information on the AP 300 reported from the UE 100 to the eNB 200 (a change in the situation of the AP 300). The WT 600 may send the AP group information (particularly the information on the AP 300 not reported from the UE 100 to the eNB 200 but updated) to the eNB 200 in response to update of the information on at least one AP 300 belonging to the group to which the AP 300 reported from the UE 100 to the eNB 200 belongs (a change in the situation of the AP 300).

The eNB 200 can receive the AP group information (particularly the information on the updated AP 300) transmitted from the WT 600 in response to update of the information on the AP 300 reported from the UE 100 to the eNB 200 (a change in the situation of the AP 300). The eNB 200 may send, to the eNB 200, the AP group information transmitted in response to update of the information on at least one AP 300 belonging to the group to which the AP 300 reported from the UE 100 to the eNB 200 belongs.

The eNB 200 can update the set AP 300 on the basis of the AP group information. The eNB 200 can notify the information on the updated AP 300 to the UE 100.

In step S90, the eNB 200 can send a WT configuration update acknowledge message to the WT 600.

As described above, the eNB 200 sends the information on the AP 300 reported from the UE 100 to the WT 600. The eNB 200 receives the AP group information on the AP group to which the AP 300 belongs from the WT 600. Thereby, the eNB 200 can know only the AP group information associated with the eNB 200 without receiving the AP group information not associated with the eNB 200 at all. Therefore, the eNB 200 and the WT 600 can appropriately share the information on WLAN.

(Variant)

A variant of the third embodiment will be described below with reference to FIG. 17. FIG. 17A and FIG. 17B are sequence diagrams for explaining the variant of the third embodiment. According to the present variant, a node different from the WT 600 (denoted as WLAN node 700 below) manages the AP groups. The description of the similar parts as in the first and second embodiments (including the variant) will be omitted as needed.

Figure 17A:
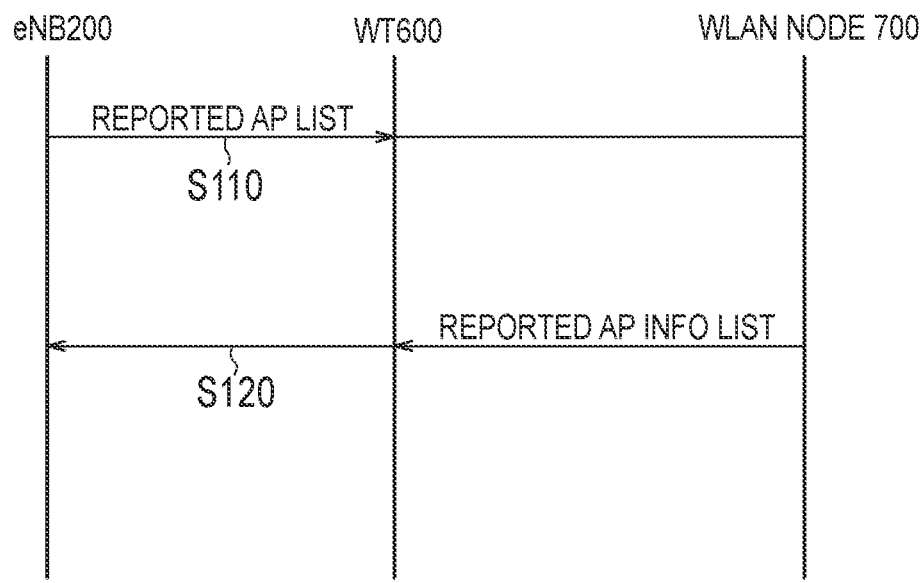
FIGS. 17A and 17B are sequence diagrams for explaining a variant of the third embodiment.

As illustrated in FIG. 17A, in step S110, the eNB 200 can send the information (Reported AP list) on the APs 300 reported from the UE 100 to the WT 600. The eNB 200 can send the information on the APs 300 to the WT 600 in an Xw setup request, an eNB configuration update message, or the like, for example. The WT 600 can receive the information from the eNB 200. Thereby, the eNB 200 can send the information on the APs 300 to the WLAN node 700 via the WT 600.

The WLAN node 700 is managed by an operator or a partner of the operator. The partner of the operator manages WLAN. The WLAN node 700 may be provided in WLAN. The WLAN node 700 may be operation administration and maintenance (OAM) for managing WLAN unlike the OAM 500 provided in the EPC 20. The WLAN node manages the AP groups. The AP groups managed by the WLAN node may be previously set by the operator or the partner of the operator. For the AP groups managed by the WLAN node, the WLAN node 700 may set the AP groups to which each AP 300 belongs similarly to the eNB 200 according to the first embodiment described above.

In step S120, the WLAN node 700 can send the AP group information (Reported AP Info list) on the AP groups to which each AP 300 belongs notified from the eNB 200 to the WT 600. The WT 600 can send the AP group information received from the WLAN node 700 to the eNB 200. Thereby, the WLAN node 700 can send the AP group information to the eNB 200 via the WT 600.

In this way, the eNB 200 can send the information on the APs 300 reported from the UE 100 to the WLAN node 700 via the WT 600, and can receive the AP group information on the AP groups to which the APs 300 belong from the WLAN node 700.

Figure 17B:
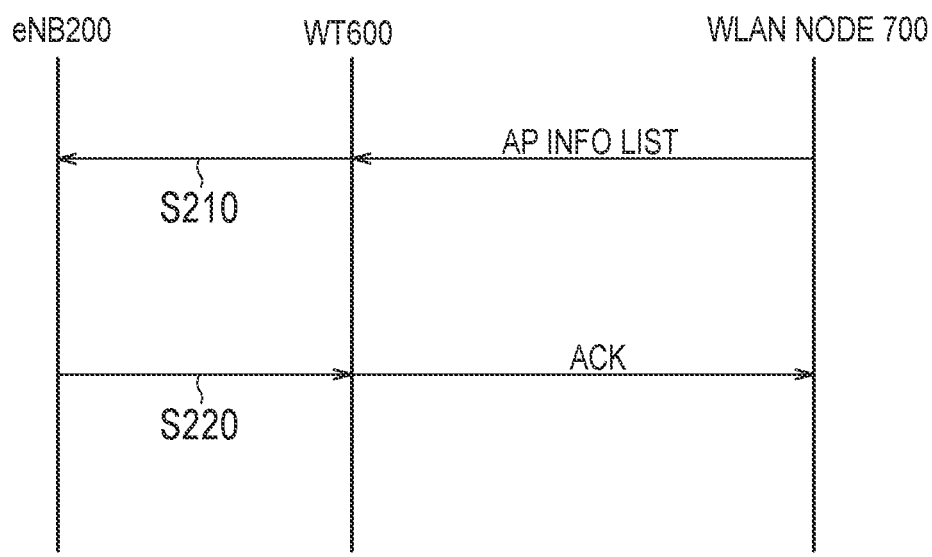

As illustrated in FIG. 17B, in step S210, when detecting a change in the situation of the AP 300 (or a group of APs 300) managed by the WLAN node 700 similarly to in the third embodiment, the WLAN node 700 can send the AP group information (AP Info list) to the eNB 200 via the WT 600.

In step S220, the eNB 200 can send ACK to the WLAN node 700 via the WT 600 in response to the reception of the AP group information.

Fourth Embodiment

Figure 19:
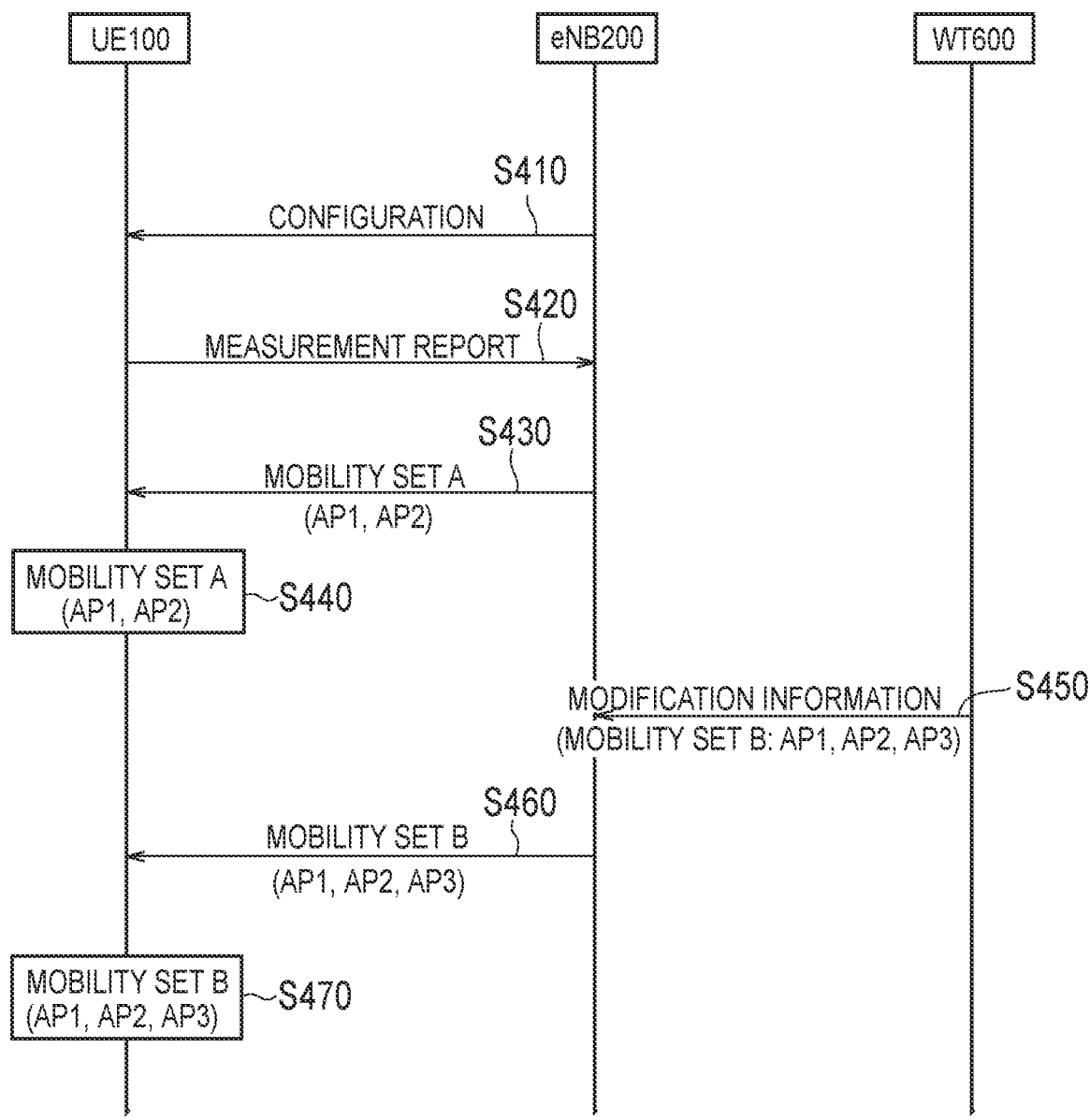
FIG. 19 is a sequence diagram for explaining an operation pattern 2 according to the fourth embodiment.

A fourth embodiment will be described below with reference to FIG. 18 to FIG. 20. FIG. 18 is a sequence diagram for explaining the operation pattern 1 according to the fourth embodiment. FIG. 19 is a sequence diagram for explaining the operation pattern 2 according to the fourth embodiment. FIG. 20 is a sequence diagram for explaining the operation pattern 3 according to the fourth embodiment. The description of the parts similar to in the respective embodiments (including the variants) will be omitted as needed.

The operations on the network have been mainly described in each embodiment described above. The operations of the UE 100 will be mainly described according to the fourth embodiment. In particular, the operations of the UE 100 are unclear when the AP group information is updated on the network after the AP group information is set in the UE 100. Thus, the UE 100 may not connect to an appropriate AP 300.

The operations of each node when the AP group information is updated on the network side will be described according to the fourth embodiment with reference to the following operation patterns 1 to 3.

The AP group information will be denoted as mobility set below. The mobility set is a set of identifiers (BSSID/HESSID/SSID) of one or more APs (WLAN APs) 300. While a bearer used by the WLAN 30 for LWA (LTE-WLAN Aggregation) or cellular/WLAN radio interworking is established in the UE 100, the WLAN mobility mechanism is applied within the range of the set. The UE 100 may perform mobility among the APs 300 belonging to the mobility set without a notification to the eNB 200. In other words, as described in the first embodiment (see FIG. 7), when changing a connection destination among the APs 300 belonging to the same mobility set, the UE 100 does not need to make a notification to the eNB 200, and does not require a command from the eNB 200.

The eNB 200 controls mobility for the AP 300 which does not belong to one mobility set provided from the eNB 200 to the UE 100. For example, when the UE 100 changes a connection destination among the APs 300 belonging to different mobility sets, the eNB 200 controls the change on the basis of a notification to the eNB 200 (such as measurement report of the APs 300).

All the APs 300 belonging to one mobility set have one common WT 600 as termination for the Xw interface (control interface (Xw-C) and the user data interface (Xw-U)).

Connection between the UE 100 and the AP 300 includes at least association between the UE 100 and the AP 300. Association is a service used for establishing access point/station (AP/STA) mapping and enabling STA calling in the distribution system services (DSSs). Connection between the UE 100 and the AP 300 may include or may not include authentication. Authentication is a service used for establishing the identity of one station (STA) as a member of a set of STAs authenticated for association with other STA.

(Operation Pattern 1)

As illustrated in FIG. 18, in step S310, the eNB 200 transmits configuration information for configuring the measurement report of the AP 300 detected by the UE 100 to the UE 100. The eNB 200 transmits the configuration information to the UE 100 in an RRC connection reestablishment message, for example. The eNB 200 may transmit the configuration information to the UE 100 in other dedicated signaling, or may transmit it in common signaling (such as SIB).

The UE 100 measures a radio signal (such as beacon signal) from the AP 300 on the basis of the configuration information. When measuring a radio signal from the AP 300 (or detecting the AP 300), the UE 100 stores the information on the AP 300 (such as identifier (such as BSSID/HESSID/SSID), signal intensity, signal quality, and measurement time of the AP 300) in the memory.

In step S320, the UE 100 transmits the measurement report including the stored information on the AP 300 to the eNB 200 on the basis of the configuration information. The eNB 200 receives the measurement report.

The eNB 200 determines a mobility set configured in the UE 100 on the basis of the measurement report. The mobility set configured in the UE 100 may be determined by a higher node (such as the MME 400 or the OAM 500) of the eNB 200 instead of the eNB 200. The description will be made below assuming that a mobility set A configured in the UE 100 is configured of (the identifiers of) AP1 and AP2 ({AP1, AP2}).

The eNB 200 transmits the information on the mobility set A to the UE 100. The eNB 200 may transmit the information to the UE 100 in dedicated signaling (such as RRC connection reestablishment message). The eNB 200 may transmit the information in common signaling (such as SIB). The mobility set A is transmitted from the eNB 200 to the UE 100 with the measurement report of the AP 300 as a trigger, and is caused by the measurement report of the AP 300.

The UE 100 configures a mobility set (mobility set A) on the basis of the information on the mobility set A received from the eNB 200. Thereafter, the UE 100 can perform mobility between AP1 and AP2 configuring the mobility set A without a notification to the eNB 200.

In step S350, the WT 600 sends modification information for notifying that the AP 300 managed by the WT 600 is modified to the eNB 200. When updating the information (such as list) on the APs 300 managed by the WT 600, the WT 600 sends the modification information to the eNB 200. For example, the modification information may be included in the WT configuration update message according to the third embodiment.

The modification information is sent with the update of the information influencing a change in the mobility set as a trigger. Thus, the modification information is updated by adding (installing) or deleting (removing) the AP 300 managed by the WT 600. It is noted that the modification information is not sent with a change in the bearer between the eNB 200 and the UE 100 via the WT 600 (including the bearer (data bearer) between the eNB 200 and the WT 600 and/or the bearer (data bearer) between the WT 600 and the UE 100) as a trigger.

The modification information may be the information on the updated mobility set A ({AP1, AP2, AP3}). The modification information may be the information on the added AP3. The modification information may be only the information indicating that AP3 is added when the eNB 200 determines the mobility set A.

The eNB 200 transmits the information (configuration information) on the mobility A to the UE 100 and then modifies the mobility set A on the basis of the modification information. The eNB 200 may update (the list of) mobility sets managed by the eNB 200. The eNB 200 modifies the mobility set A under a different condition from the measurement report from the UE 100.

In step S360, when the mobility set A is modified, the eNB 200 transmits the information on the modification of the mobility set A to the UE 100. In the operation pattern 1, the information on the modification of the mobility set A relates to the modification of the APs 300 configuring the mobility set A configured in the UE 100. Thus, the eNB 200 transmits the information on the modification of the APs 300 configuring the mobility set A configured in the UE 100 as the information on the modification of the mobility set A to the UE 100.

The information on the modification of the mobility set A may be all the information on the modified mobility set A ({AP1, AP2, AP3}). The information on the modification of the mobility set A may be information on a difference from the APs configuring the mobility set A configured in the UE 100 (or the identifier of the added AP4 and/or the identifier of the deleted AP4 ({AP4})). The identifier of the mobility set A is associated with the identifiers ({AP1, AP2, AP3}) of the APs 300 in the information on the modification of the mobility set A.

The eNB 200 transmits the information on the modification of the mobility set to the UE 100 with the modification information from the WT 600 as a trigger. Thus, the information on the modification of the mobility set is caused by a different condition (specifically, update of the information on the APs 300 managed by the WT 600) from the measurement report from the UE 100.

In step S370, when configuring the mobility set and then receiving the information on the modification of the mobility set, the UE 100 modifies the configured mobility set A on the basis of the information on the modification of the mobility set.

In the operation pattern 1, the UE 100 updates the configured mobility set A thereby to modify the mobility set A. The UE 100 may reconfigure the entire mobility set A in order to update the configured mobility set A. The UE 100 may reconfigure part (AP4) of the mobility set A. Thereby, the mobility set A ({AP1, AP2, AP3}) is reconfigured (updated) in the UE 100. Even while the UE 100 is modifying the mobility set A, the bearer for LWA (or the bearer between the eNB 200 and the UE 100 via the WT 600) may (not be stopped and) be available.

(Operation Pattern 2)

The operation pattern 2 will be described. The UE 100 updates the mobility set A in the operation pattern 1. The UE 100 (re)configures a new mobility set in the operation pattern 2. The description of the similar parts as in the operation pattern 1 will be omitted as needed. As illustrated in FIG. 19, steps S410 to S440 correspond to steps S310 to S340.

In step S450, the WT 600 sends the modification information to the eNB 200. The modification information may be information on a new mobility set B ({AP1, AP2, AP3}). The modification information may be information on the added AP3 similarly to in the operation pattern 1. When the eNB 200 determines the mobility set A, the modification information may be only information indicating that AP3 is added. That is, the eNB 200 may assume the mobility set in which AP4 is added to the mobility set A as a new mobility set B.

The eNB 200 transmits the information (configuration information) on the mobility set A to the UE 100 and then modifies the mobility set A on the basis of the modification information. Specifically, the eNB 200 deletes the mobility set A and stores the new mobility set B. The eNB 200 may update (the list of) mobility sets managed by the eNB 200.

In step S460, when the mobility set A is modified, the eNB 200 transmits the information on the modification of the mobility set A to the UE 100. In the operation pattern 2, the information on the modification of the mobility set A is the information on the new mobility set B different from the mobility set A configured in the UE 100. Thus, the eNB 200 transmits, to the UE 100, the information on the new mobility set B different from the mobility set A transmitted to (configured in) the UE 100 as the information on the modification of the mobility set A.

The identifier of the mobility set B is associated with the identifiers ({AP1, AP2, AP3}) of the APs 300 in the information on the modification of the mobility set A. The identifier of the mobility set A is different from the identifier of the mobility set B, and the UE 100 recognizes the mobility set B different from the configured mobility set A as a new mobility set.

In step S470, the UE 100 modifies the configured mobility set A on the basis of the information on the new mobility set B. In the operation pattern 2, the UE 100 configures (reconfigures) the new mobility set B thereby to modify the mobility set A. The UE 100 may modify a mobility set in a predetermined procedure. The UE 100 reconfigures the mobility set in the predetermined procedure such that the mobility set A transits to the mobility set B. Thus, even when the APs configuring the mobility set A partially overlap with the APs configuring the mobility set B, the UE 100 (re)configures the mobility set B as a new mobility set.

Until the UE 100 terminates the predetermined procedure, the bearer between the eNB 200 and the UE 100 via the WT 600 may be (stopped and) unavailable.

(Operation Pattern 3)

The operation pattern 3 will be described. The eNB 200 transmits the mobility set to the UE 100 in response to a request of the UE 100 in the operation pattern 3. The description of the similar parts as in the operation pattern 1 or 2 will be omitted as needed. As illustrated in FIG. 20, steps S510 to S550 correspond to steps S310 to S350.

In step S560, the eNB 200 transmits update information as the information on the modification of the mobility set. The update information indicates that the mobility set is updated. The update information may be information indicating how the mobility set is updated (such as a list in which the mobility set and the identifiers of the APs are associated). The update information may be flag information ("0" indicates not-updated and "1" indicates updated, for example).

When the mobility set A ({AP1, AP2}) is modified to the mobility set A ({AP1, AP2, AP3}) as in the operation pattern 1, the eNB 200 may transmit the update information. When the mobility set A is modified to the mobility set B as in the operation pattern 2, the eNB 200 may transmit the update information. The eNB 200 may transmit the update information to the UE 100 in dedicated signaling (such as RRC connection reestablishment message). The eNB 200 may transmit the update information to the UE 100 in common signaling (such as SIB).

In step S570, when determining that the mobility set is updated on the basis of the update information, the UE 100 transmits a message (mobility set request) for requesting the information on the modification of the mobility set (information on the modified mobility set). When the configured mobility set is not updated, the UE 100 may not transmit the message.

In step S580, when receiving the message for requesting the information on the modification of the mobility set from the UE 100, the eNB 200 transmits the information on the modification of the mobility set (or the information on the modified mobility set) to the transmission source UE 100. Step S580 corresponds to step S360. Step S590 corresponds to step S370.

As described above, after the information on the mobility set is transmitted to the UE 100, the eNB 200 modifies the mobility set. Further, when the mobility set is modified, the eNB 200 transmits the information on the modification of the mobility set to the UE 100. When configuring the mobility set and then receiving the information on the modification of the mobility set, the UE 100 modifies the configured mobility set on the basis of the information on the modification of the mobility set. Thereby, even when the mobility set is updated, the UE 100 can appropriately modify the mobility set, and thus the UE 100 can connect to an appropriate AP 300 on the basis of the modified mobility set.

Other Embodiment

The contents of the present application have been described by way of the above embodiments, but the description and the drawings forming part of the disclosure should not be understood as limiting the contents of the present application. Various alternative embodiments, examples, and operational techniques are apparent to those skilled in the art on the basis of the disclosure.

In each embodiment described above, the WT 600 may be an AC (access controller) for managing (controlling) the APs 300, for example. The WT 600 may be a network apparatus which is a higher node of the AC and manages the AC.

The operations according to the above embodiments and variants may be performed in combination as needed.

For example, the WLAN node 700 may manage the information on the AP groups in the first and second embodiments as in the third embodiment. The WT 600 can send the information received from the eNB 200 to the WLAN node 700. Further, the WT 600 can send the information received from the WLAN node 700 to the eNB 200.

The eNB 200 directly receives the report of the APs 300 from the UE 100 according to the third embodiment, but is not limited thereto. The eNB 200 may send the report of the APs 300 received via a neighboring eNB 200 to the WT 600. When the UE 100 detects a cell of the eNB 200 while detecting the AP 300, the neighboring eNB 200 may transfer the report from the UE 100 to the eNB 200. For example, when the report from the UE 100 includes not only the identification information on the APs 300 but also the identification information on the cell (cell ID), the neighboring eNB 200 may transfer the report to the eNB 200 managing the cell.

The operations of the UE 100, the eNB 200, and the WT 600 in a series of sequences have been described above in the third embodiment, but only part of the operations may be performed and all the operations may not be performed. For example, the operations in steps S20 and S30 may be omitted and the operations in steps S80 and S90 may be omitted.

The WT 600 transmits the modification information to the eNB 200 according to the fourth embodiment, but is not limited thereto. A higher node (such as the MME 400 or the OAM 500) of the eNB 200 may transmit the modification information to the eNB 200.

The different condition from the measurement report from the UE 100 may not be to update the information on the APs 300 managed by the WT 600 according to the fourth embodiment. For example, when a higher node (such as the MME 400 or the OAM 500) of the eNB 200 manages the information on the APs 300, the mobility set may be modified in response to update of the information on the APs 300 managed by the higher node. The information on the modification of the mobility set may be caused by the update.

In the operation patterns 1 and 2 according to the fourth embodiment, the eNB 200 may periodically transmit the information on the modification of the mobility set to the UE 100. The UE 100 may reconfigure (or update) the mobility set whenever receiving the information on the modification of the mobility set.

The UE 100 modifies the mobility set in the operation pattern 3 according to the fourth embodiment as in the operation pattern 1, but may modify the mobility set as in the operation pattern 2.

In the operation pattern 3 according to the fourth embodiment, the eNB 200 transmits the update information but the AP 300 may transmit the update information. When receiving the information indicating that the information on the APs 300 managed by the WT 600 is updated from the WT 600, the AP 300 may transmit the update information. The UE 100 may transmit a message for requesting the information on the modified mobility set to the eNB 200 on the basis of the update information from the AP 300.

Though not particularly stated in the above embodiments, there may be provided a program for causing a computer to perform each processing performed by any of the respective nodes (such as the UE 100, the eNB 200, the AP 300, the MME 400, and the WT 600). Further, the program may be recorded in a computer readable medium. The program can be installed in a computer by use of a computer readable medium. Here, a computer readable medium recording the program therein may be a non-transitory recording medium. The non-transitory recording medium may be CD-ROM, DVD-ROM, and the like, for example, though not particularly limited.

Alternatively, there may be provided a chip configured of a memory storing a program for performing each processing by any of the UE 100, the eNB 200, and the AP 300, and a processor for executing the program stored in the memory.

The LTE system has been described as an exemplary mobile communication system according to the above embodiments, but systems other than the LTE system may be applied to the present disclosure, not limited to the LTE system.

The invention claimed is:

1. A base station in Evolved-Universal Terrestrial Radio Access Network (E-UTRAN), comprising:
a processor,
wherein the processor is configured to
configure in a radio terminal a mobility set for LTE-WLAN aggregation (LWA), the mobility set including a set of access points in wireless local area network (WLAN),
modify the mobility set, and
transmit information indicating the modified mobility set to the radio terminal,
wherein the information indicating the modified mobility set includes information indicating an access point deleted from the mobility set configured in the radio terminal, and
wherein the processor is configured to notify the modified mobility set to a network apparatus as a termination in the WLAN.

2. The base station according to claim 1,
wherein the information indicating the modified mobility set further includes information indicating an access point added to the mobility set configured in the radio terminal.

3. A processor for controlling a base station in evolved-universal terrestrial radio access network (E-UTRAN),
wherein the processor is configured to
configure in a radio terminal a mobility set for LTE-WLAN aggregation (LWA), the mobility set including a set of access points in wireless local area network (WLAN),
modify the mobility set, and
transmit information indicating the modified mobility set to the radio terminal, and
the information indicating the modified mobility set includes information indicating an access point added to the mobility set configured in the radio terminal,
wherein the information indicating the modified mobility set includes information indicating an access point deleted from the mobility set configured in the radio terminal, and
wherein the processor is configured to notify the modified mobility set to a network apparatus as a termination in the WLAN.

* * * * *